(12) United States Patent
Fukuda

(10) Patent No.: US 6,367,230 B1
(45) Date of Patent: Apr. 9, 2002

(54) METHOD OF FORMING, FILLING, AND SEALING BAGS CONTINUOUSLY AND AN APPARATUS FOR FORMING, FILLING AND SEALING BAGS

(75) Inventor: Masao Fukuda, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 09/494,542

(22) Filed: Jan. 31, 2000

(30) Foreign Application Priority Data

Feb. 3, 1999 (JP) .............................. 11-025663

(51) Int. Cl.$^7$ ................................................ B65B 9/00
(52) U.S. Cl. .............................. 53/451; 53/477; 53/548; 53/551
(58) Field of Search ............................ 53/451, 551, 477, 53/548, 552, 463

(56) References Cited

U.S. PATENT DOCUMENTS

| | | | |
|---|---|---|---|
| 2,145,941 A | * | 2/1939 | Maxfield ........................ 53/451 |
| 3,040,490 A | * | 6/1962 | Virta ............................. 53/451 |
| 3,668,815 A | | 6/1972 | Henry et al. |
| 3,778,961 A | * | 12/1973 | Lesher ........................... 53/28 |
| 3,849,965 A | | 11/1974 | Dominici |
| 4,391,081 A | | 7/1983 | Kovacs |
| 4,656,818 A | * | 4/1987 | Shimoyama et al. ......... 53/551 |
| 4,663,917 A | | 5/1987 | Taylor et al. |
| 4,729,210 A | * | 3/1988 | Galliano ....................... 53/441 |
| 4,947,618 A | | 8/1990 | Schneider et al. |
| 5,279,098 A | * | 1/1994 | Fukuda ......................... 53/451 |
| 5,485,712 A | * | 1/1996 | Cherney et al. ............... 53/436 |
| 5,540,035 A | | 7/1996 | Plahm et al. |
| 5,832,700 A | * | 11/1998 | Kammler et al. ............. 53/502 |
| 5,881,539 A | * | 3/1999 | Fukuda et al. ................ 53/526 |
| 5,893,260 A | * | 4/1999 | McKenna ..................... 53/451 |
| 6,052,971 A | * | 4/2000 | Malsam et al. ............... 53/441 |
| 6,067,778 A | * | 5/2000 | Yamamoto et al. ........... 53/451 |

FOREIGN PATENT DOCUMENTS

| | | |
|---|---|---|
| EP | 0 811 557 A2 | 12/1997 |
| JP | 63-191706 | 8/1988 |

* cited by examiner

Primary Examiner—John Paradiso
(74) Attorney, Agent, or Firm—Shinjyu Global IP Counselors, LLP

(57) ABSTRACT

A bag packaging apparatus includes a forming mechanism, a pull down belt mechanism, a longitudinal seal mechanism, a latitudinal seal mechanism, and a settling mechanism. The forming mechanism forms films into tubular shape. The pull down belt mechanism conveys the tubular film F. The longitudinal seal mechanism seals the tubular film F in a longitudinal direction. The latitudinal seal mechanism seals the tubular film F in a latitudinal direction. The settling mechanism is disposed between the forming mechanism and the latitudinal seal mechanism, and between the longitudinal mechanism and the latitudinal mechanism. The settling mechanism presses a portion of the tubular film F that is going to become an upper end of a bag and a bottom end of a following bag, while seal jaws 78 seal the tubular film F. The sealed portion becomes a bottom end of the bag. The following bag follows the bag, whose bottom end is the sealed portion.

14 Claims, 17 Drawing Sheets

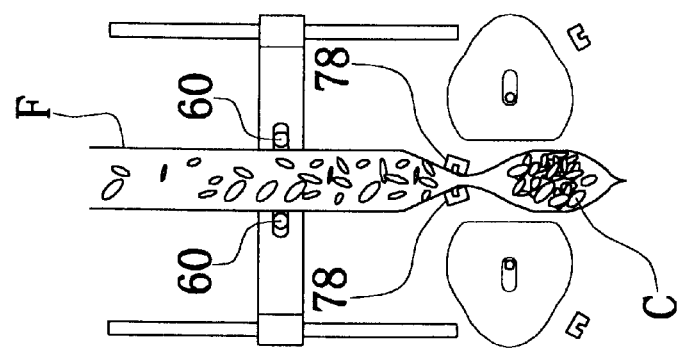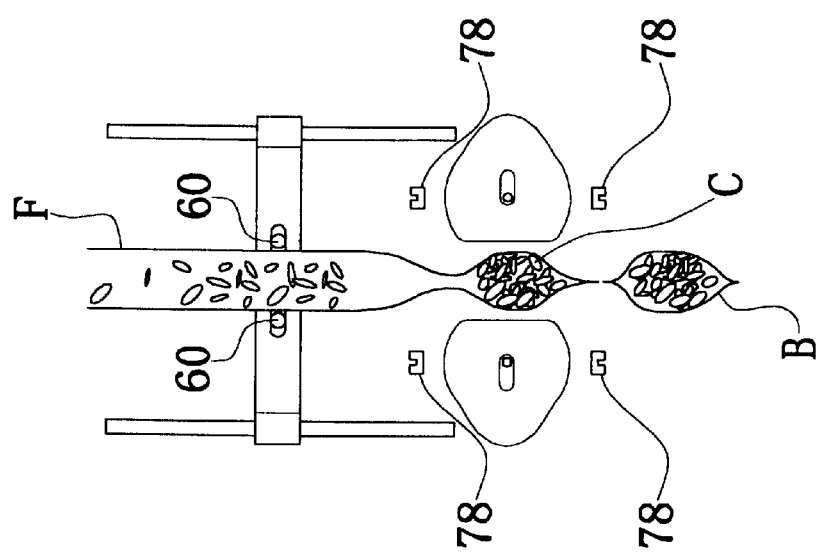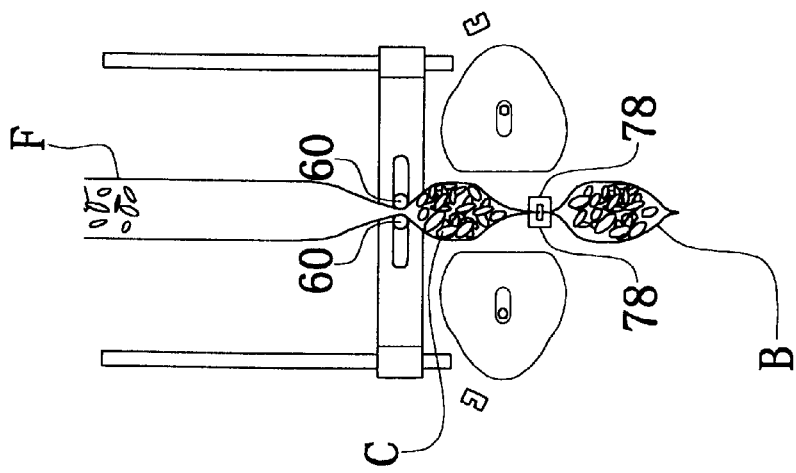

METHOD OF FORMING, FILLING, AND SEALING BAGS CONTINUOUSLY AND AN APPARATUS FOR FORMING, FILLING AND SEALING BAGS

BACKGROUND OF THE INVENTION

A. Field of the Invention

The present invention relates to a method of forming, filling and sealing bags continuously and an apparatus for forming, filling and sealing bags. More specifically, the present invention relates to a method of packaging bags continuously in a bag-packaging machine that fills articles to be packaged in a bag while forming the bag by sealing portions of tubular packaging materials, where the tubular packaging materials are conveyed in a downward direction and are sealed after inserting articles therein. The present invention also relates to a bag packaging mechanism that packages bags by sealing portions of a tubular packaging material in longitudinal and latitudinal directions while inserting articles to be packaged therein.

B. Description of the Related Art

There has been a longitudinal bag-packaging machine that fills articles such as foods to be packaged in a bag while forming and sealing the bag.

For instance, a longitudinal pillow packaging machine forms a packaging material which is a sheet-shaped film into tubular shape by using a former and a tube. Longitudinal seal means seals (heat sealing) longitudinal edges of the tubular packaging materials that are placed one on top of another, thereby making bags. The pillow packaging machine fills articles to be packaged into the tubular packaging materials through the tube. Latitudinal sealing mechanism below the tube seals the upper portion of a bag and the bottom portion of a following bag. Then the pillow packaging machine cuts the middle of the latitudinally sealed portion. In such pillow packaging machine, operations of making a bag and filling articles in the bag occur in a continuous manner.

Some of such bag packaging apparatuses perform packing operations. Packing operations are especially important when articles to be packaged are small in apparent specific gravity but large in size. Examples of such articles include potato chips.

U.S. Pat. No. 4,391,081 and Japanese Laid-Open Patent Application Sho 63-191706 disclose such packing operation. In either method, a portion of the tubular packaging material to be sealed is pressed by stripper rods immediately before a pair of seal portions called seal jaws seals the tubular packaging material latitudinally by holding the tubular packaging material therebetween. In this manner, the portion to be sealed is pressed before the seal portions seal the portion, such that articles in that portion will be packed or pushed down (compressed) to a lower portion of the bag. Consequently, the packing operation attempts to prevent improper sealing that occurs due to some articles being sealed with the tubular packaging material at the time of sealing.

Problem to be solved by the Invention

Recently, there has been an increasing demand for bag packaging apparatuses that are capable of high speed processing. Consequently, there has been a need for high speed conveyance of tubular packaging materials and high speed processing by latitudinal seal mechanisms.

Accordingly, pressing operation also needs to be performed at a high speed. However, if packing operations are performed too fast, a bottom end of a bag which has already been sealed may burst or blowout because of an increase in the internal pressure of the bag during the packing operations performed at an upper end of the bag. The stripper rods in the Japanese reference mentioned above are urged by springs against the packaging material and therefore it is not possible to form a gap between the stripper rods in order to prevent such blowouts. Even if a gap were formed between ends of the stripper rods, thin articles such as potato chips may not be properly packed or pushed down, and some of the articles may remain in the sealing portion. This would nullify the purpose of pushing the materials in the bag away from the region of the sealing portion prior to sealing.

In view of the above, there exists a need for an improved latitudinal seal mechanism for a bag packaging apparatus which overcomes the above mentioned problems in the prior art. This invention addresses this need in the prior art as well as other needs, which will become apparent to those skilled in the art from this disclosure.

SUMMARY OF THE INVENTION

One object of the present invention is to enable latitudinal sealing without sealing articles to be packaged with the tubular packaging material, even when bags are packaged at high speed.

In accordance with one aspect of the present invention, there is a method of forming bags continuously, including inserting articles to be packaged in a tubular packaging material that is conveyed in a downward direction, and sealing the tubular packaging material to form a bag. The method includes the steps of:

inserting articles to be packaged in a partially formed bag;

sealing a lower end of the bag and an upper end of a preceding bag and simultaneously contacting a portion of the tubular packaging material that subsequently forms an upper portion of the bag in order to begin urging the articles downward.

In accordance with another aspect of the present invention, there is a method of forming bags continuously, including inserting articles to be packaged in a tubular packaging material that is conveyed in a downward direction, and sealing the tubular packaging material to form a bag. The method includes the steps of:

inserting articles to be packaged in a partially formed first bag before bottom and upper ends of the first bag are sealed;

sealing a lower end of the first bag and an upper end of a preceding bag and simultaneously contacting a portion of the tubular packaging material that subsequently forms an upper portion of the first bag in order to urge the articles downward, members contacting the portion of the tubular packaging material being spaced apart with a predetermined gap therebetween; and sealing a lower end of a second bag and the upper end of the first bag and simultaneously contacting a portion of the tubular packaging material that subsequently forms an upper portion of the second bag in order to urge the articles downward, members contacting the portion of the tubular packaging material being spaced apart with a predetermined gap therebetween.

In accordance with yet another aspect of the present invention, there is a method of forming bags continuously, including inserting articles to be packaged in a tubular packaging material that is conveyed in a downward direction, and sealing the tubular packaging material to form a bag. The method includes the steps of:

inserting articles to be packaged in a partially formed first bag before bottom and upper ends of the first bag are sealed;

sealing a lower end of the first bag and an upper end of a preceding bag;

contacting a portion of the tubular packaging material that subsequently forms an upper portion of the first bag in order to urge the articles downward, members contacting the portion of the tubular packaging material being spaced apart with a predetermined gap therebetween;

inserting articles to be packaged in a partially formed second bag before bottom and upper ends of the first bag are sealed;

sealing a lower end of a second bag and the upper end of the first bag; and contacting a portion of the tubular packaging material that subsequently forms an upper portion of the second bag in order to urge the articles downward, members contacting the portion of the tubular packaging material being spaced apart with a predetermined gap therebetween.

In the above methods, in each of the contacting steps, the members contacting the portion of the tubular packaging material move downward at a rate greater than a rate of downward movement of the tubular packaging material.

Preferably, each of the sealing steps further includes the steps of:

moving sealing members downward in a pre-pressing process on opposite sides of the tubular packaging material at a rate slightly higher than the rate of downward movement of the tubular packaging material with the sealing members spaced apart from each other by a predetermined gap; and moving the sealing members into firm contact with the tubular packaging material for sealing the tubular packaging material.

In accordance with another aspect of the present invention, a bag packaging apparatus for producing bags filled with articles to be packaged, includes sealing a tubular packaging material in longitudinal and latitudinal directions to form the bags. The bag packaging apparatus includes forming means for forming a sheet-shaped packaging material supplied thereto into tubular shape for receiving the articles to be packaged. The apparatus also includes a packaging material conveyance mechanism for conveying the tubular packaging material in a downward direction, and a longitudinal seal mechanism for joining in a longitudinal direction overlapping portions of the tubular packaging material conveyed thereto to partially form the bags. A latitudinal seal mechanism joins in a latitudinal direction portions of the tubular packaging material conveyed thereto with a predetermined distance between the portions. The latitudinal seal mechanism is disposed below the forming means and the longitudinal sealing means. A settling mechanism is disposed between the forming means and the latitudinal sealing means, and between the longitudinal sealing means and the latitudinal sealing means. The settling mechanism is adapted for contacting a portion of the tubular packaging material that is subsequently sealed by the latitudinal seal mechanism, the portion becoming an upper portion of one bag and a bottom end of another bag. The settling mechanism is adapted to urge the articles to be packaged downward.

Preferably, the latitudinal seal mechanism includes means for pre-pressing the tubular packaging material prior to sealing such that the portion of the tubular packaging material to be sealed is pressed lightly together just before the latitudinal seal mechanism joins the tubular packaging material in the latitudinal direction.

Preferably, the latitudinal sealing mechanism includes two sealing members and the means for pre-pressing includes cam surfaces such that in response to the sealing members being engaged with the cam surfaces the sealing members pre-press the tubular packaging material with a predetermined gap between the sealing members.

Preferably, the settling mechanism includes two pressing rods supported in the bag packaging apparatus. The two pressing rods are adapted for selective vertical movement with respect to the tubular packaging material with a predetermined gap therebetween while contacting the tubular packaging material. The gap between the pressing rods is greater than the gap between the sealing members as the sealing members pre-press the tubular packaging material.

Preferably, the pressing rods are adapted for selective vertical movement with respect to the tubular packaging material by a distance that is greater than a longitudinal distance in which the sealing members pre-press the tubular packaging material.

Preferably, the settling mechanism is adapted to complete vertical movement in contact with the portion of the tubular packaging material before the latitudinal seal mechanism seals the bottom end of one bag and the upper end of a previous bag.

Preferably, the bag packaging apparatus includes a control unit connected to the settling mechanism for controlling the settling mechanism.

Preferably, the bag packaging apparatus also includes a controller connected to the sealing mechanism for controlling the sealing mechanism.

In the above described methods, when a bottom end of the bag and an upper end of a preceding bag are sealed, a portion of the tubular packaging material that becomes the upper end of one bag and the bottom end of the following bag is contacted prior to sealing to settle the articles in the bag toward the bottom of the bag. In conventional configurations, the tubular material is pressed only just prior to sealing. However in the method of the present invention, the portion that to be sealed (or an area around the portion) is contacted at a step prior to sealing and prior to pre-pressing in order to help the articles in the bag to settle to the bottom of the bag.

In this manner, a predetermined portion of the bag is cleared of articles prior to sealing. Further, the settling mechanism contacts the tubular packaging material over a predetermined contact distance to insure packing of the articles away from the portion of the tubular packaging material to be sealed. Therefore, the tubular packaging material can be sealed securely without interference with articles inside the soon to be formed bag, even when bags are packaged at a high speed. Also, since the upper end is pressed when the bottom end is sealed, the bottom end is not likely to blowout during the settling process.

In the settling process, it is preferable to contact a portion of the tubular packaging material that is to be sealed prior to the sealing process. However, if it is difficult to press the portion due to problems such as a conflict between the member to be sealed and the sealing member, the area around the portion to be sealed can be contacted instead. Articles are moved from the portion of the tubular packaging material that is to be sealed.

By the above described method, bags can be filled and sealed continuously at a rapid rate because the articles within the tubular packaging material are packed downward or urged downward by the settling mechanism. As one bag is sealed, the next bag is already filled and being packed by the settling mechanism, soon to be ready for sealing.

The method of the present invention includes pre-pressing by the sealing mechanism and packing by the settling mechanism. The settling process gently presses an upper end of the bag (or an area near the upper end) while the bottom end is sealed. Due to manipulations of the articles by the settling mechanism, the articles to be packaged are pushed into the lower portion of the bag by the time the bag reaches the pre-pressing stage of the sealing members. Therefore, burden on the pre-pressing process can be reduced. Moreover, it is highly unlikely that the articles to be packaged will be sealed with in the sealing portion of the tubular packaging material at the time of sealing.

Since the method has both the pre-pressing process of the sealing members and the settling process of the settling mechanism, contact with the tubular packaging material by the settling mechanism does not require firm contact but rather only requires a gentle push downward. The settling mechanism performs a gentle push because the pressing rods of the settling mechanism are always spaced apart from one another by a predetermined gap. Consequently, there is more flexibility as to how the settling process may be configured. For instance, the gap of the settling process at the time of pressing can be made greater, and contact area distance can be made longer if desired.

When large amounts of articles need to be packaged in a bag, the articles are filled in the bag at several different steps. In such a case, conventional method performs shaking process (oscillating process) after every filling process to increase the density of the articles in the bag. However, the method of the present invention can eliminate the shaking process. Since the density of the articles in the bag can be increased through the settling process, shaking process is no longer necessary.

In the bag packaging apparatus of the present invention, the settling mechanism contacts an upper end of a bag and a bottom end of a subsequent bag (or an area near the ends) when the latitudinal seal mechanism joins (seals) a bottom end of the bag. Therefore, the settling mechanism is disposed between the forming means and the latitudinal seal mechanism, and between the longitudinal seal mechanism and the latitudinal seal mechanism.

In this manner, the bag packaging mechanism includes a settling mechanism that is separate from the latitudinal seal mechanism and presses a portion different from the portion to be sealed by the latitudinal seal mechanism. Therefore, the amount of pressing, in other words the pressing distance can be increased as desired. Consequently, the tubular packaging material can be sealed in latitudinal direction without sealing articles to be packaged together, even when the bag packaging apparatus operates at a high speed. Also, since the bottom end of the bag is sealed as the upper end of the bag and the bottom end of the following bag (or the area near the ends) are pressed, it is less likely that the bottom end of the bag will blowout.

The bag packaging apparatus includes the pre-pressing machine as well as the settling mechanism. Therefore, when the tubular packaging material is joined in the latitudinal direction, the articles to be packaged are securely pushed into the lower portion of the bag whose upper end is the joined portion. In this manner, it is even less likely that the articles to be packaged are joined together in the joined portion when the tubular packaging material is joined, thereby enabling more secure joint.

If the settling mechanism should prolong pressing the upper end of the bag (or the area near the upper end) after the bottom end of the bag is joined, it is likely that the bottom end of the bag will blowout, especially since the joint at the bottom end is not tight right after the completion of joint. In the bag packaging apparatus of the present invention, however, the settling mechanism finishes pressing the upper end of the bag (or the area near the upper end) before the latitudinal seal mechanism completes joining the bottom end of the bag. Therefore, by the time the bottom end of the bag is joined, the bag is no longer subject to an increase in pressure due to pressing by the settling mechanism, whereby the bottom end of the bag is not likely to blowout.

Since the movement of the contacting mechanism does not depend on the movement of the latitudinal seal mechanism, the contact distance can be easily made longer.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

Referring now to the accompanying drawings which form a part of this original disclosure:

FIGS. 16A, 16B, 16C, 16D, 16E and 16F are views showing differing stages of a settling and latitudinal sealing process.

DETAILED DESCRIPTION OF THE INVENTION

FIRST EMBODIMENT

Overall Structure

Figure 1:
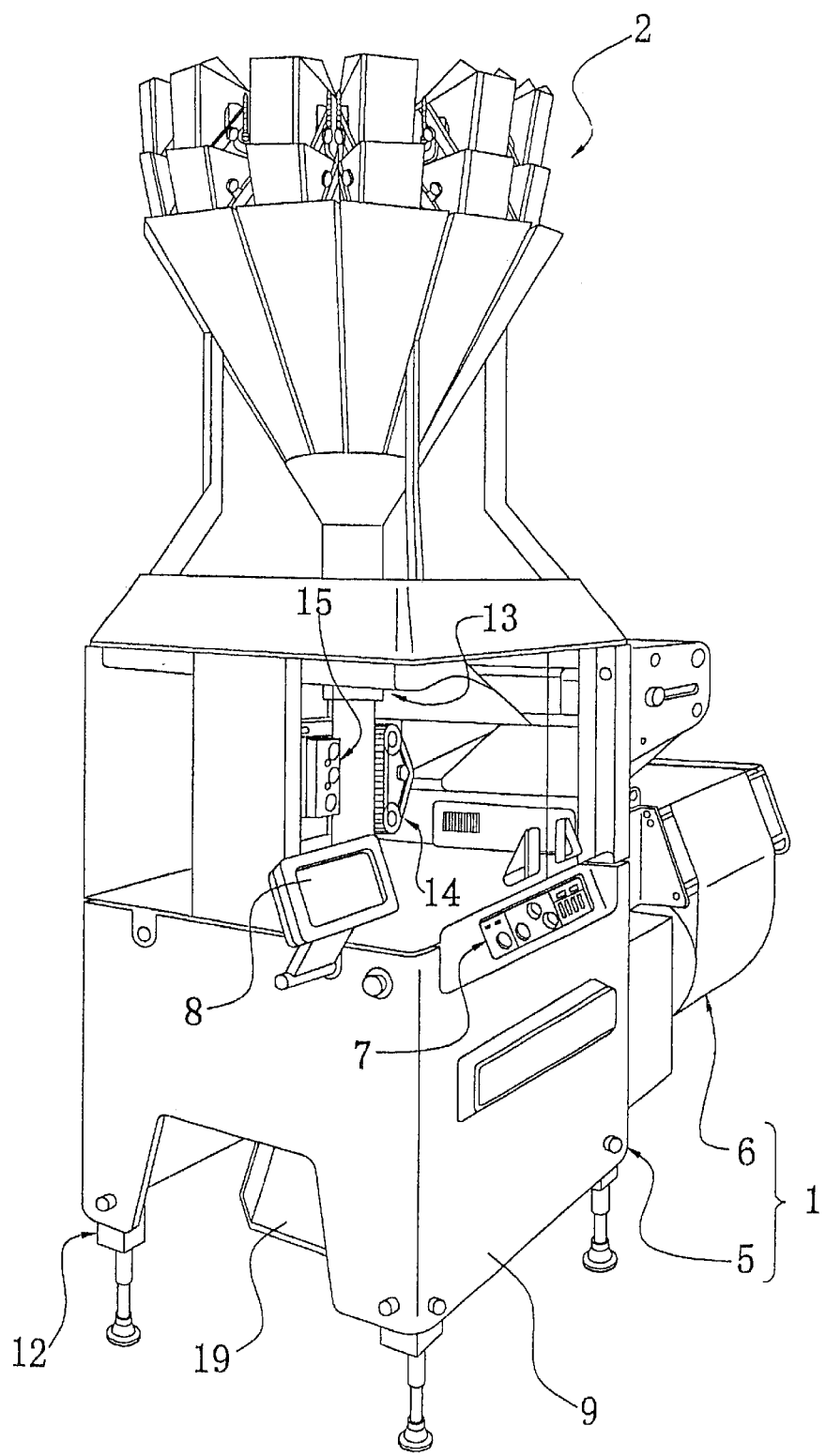
FIG. 1 is a perspective view of a bag packaging apparatus that employs a method in accordance with one embodiment of the present invention.
Figure 3:
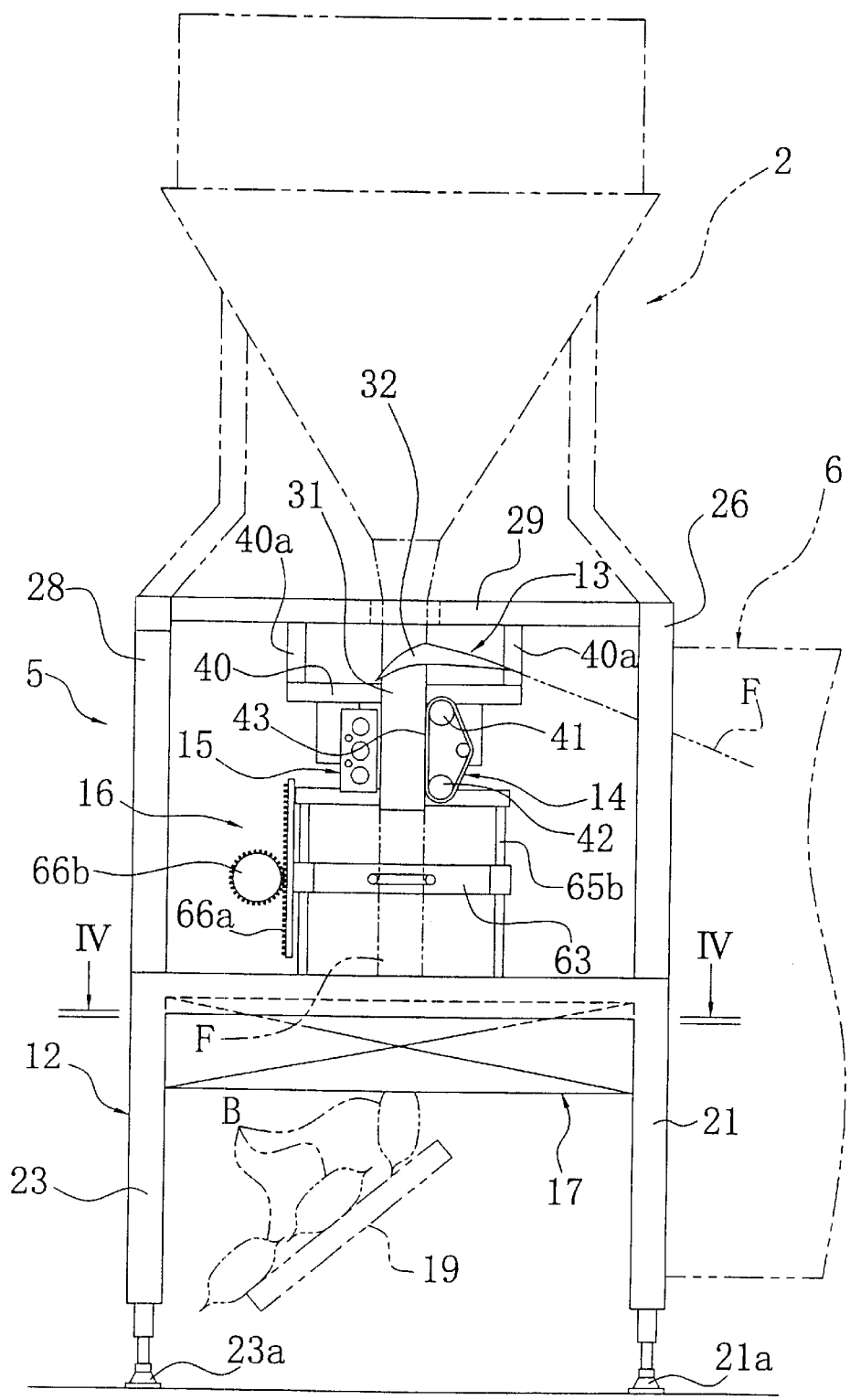
FIG. 3 is a side view of a bag packaging unit of the bag packaging apparatus depicted in FIG. 1 in accordance with the present invention.

FIGS. 1 and 3 show a bag packaging apparatus in accordance with the first embodiment of the present invention. The bag packaging apparatus 1 shown therein is a machine for packaging, for instance, potato chips, and mainly includes a bag packaging unit 5 and a film supply unit (packaging material supply unit) 6. The bag packaging unit 5 is a main portion of the bag packaging apparatus 1, in which potato chips are filled in bags. The film supply unit 6 supplies film to the bag packaging unit 5 such that the bags can be made from the film. On the front surface of the bag packaging unit 5 are various operational switches 7. A LCD display 8 that shows operational status of the bag packaging apparatus 1 is also disposed on a certain position such that an operator who operates the operational switches 7 can visually recognize the display 8.

Structure of Each Unit

The film supply unit 6 supplies sheet-shaped film to a forming mechanism 13 of the bag packaging unit 13. In one embodiment, the film supply unit 6 is disposed adjacent to the bag packaging unit 5. The film supply unit 6 includes a roll of film, out of which film is supplied. Since replacement a roll requires a certain amount of space around the film supply unit 6, the film supply unit 6 does not need to be adjacent to the bag packaging unit 5. Instead, the film supply unit 6 and the bag packaging unit 5 can be disposed apart from each other.

Referring to FIGS. 1 and 3, the bag packaging unit 5 includes a forming mechanism 13, a pull-down belt mechanism (packaging material conveyance mechanism) 14, a longitudinal seal mechanism 15, a settling mechanism (packing mechanism) 16, a latitudinal seal mechanism 17, and a support frame 12. The forming mechanism 13 forms the sheet-shaped films into a tubular shape. The pull-down belt mechanism 14 conveys the film formed in the tubular shape (hereinafter referred to as tubular film) in a downward direction. The longitudinal seal mechanism 15 seals (heat-seals) overlapping portions of the tubular film in a longitudinal direction to form the tubular shape of the tubular film. The settling mechanism 16 contacts and urges downward the contents of the tubular packaging film before the tubular packaging film is sealed latitudinally. The latitudinal seal mechanism 17 seals the tubular film in a latitudinal direction, thereby closing upper and bottom ends of bags. The support frame 12 supports these mechanisms. A casing 9 is disposed around the support frame 12.

Figure 2:
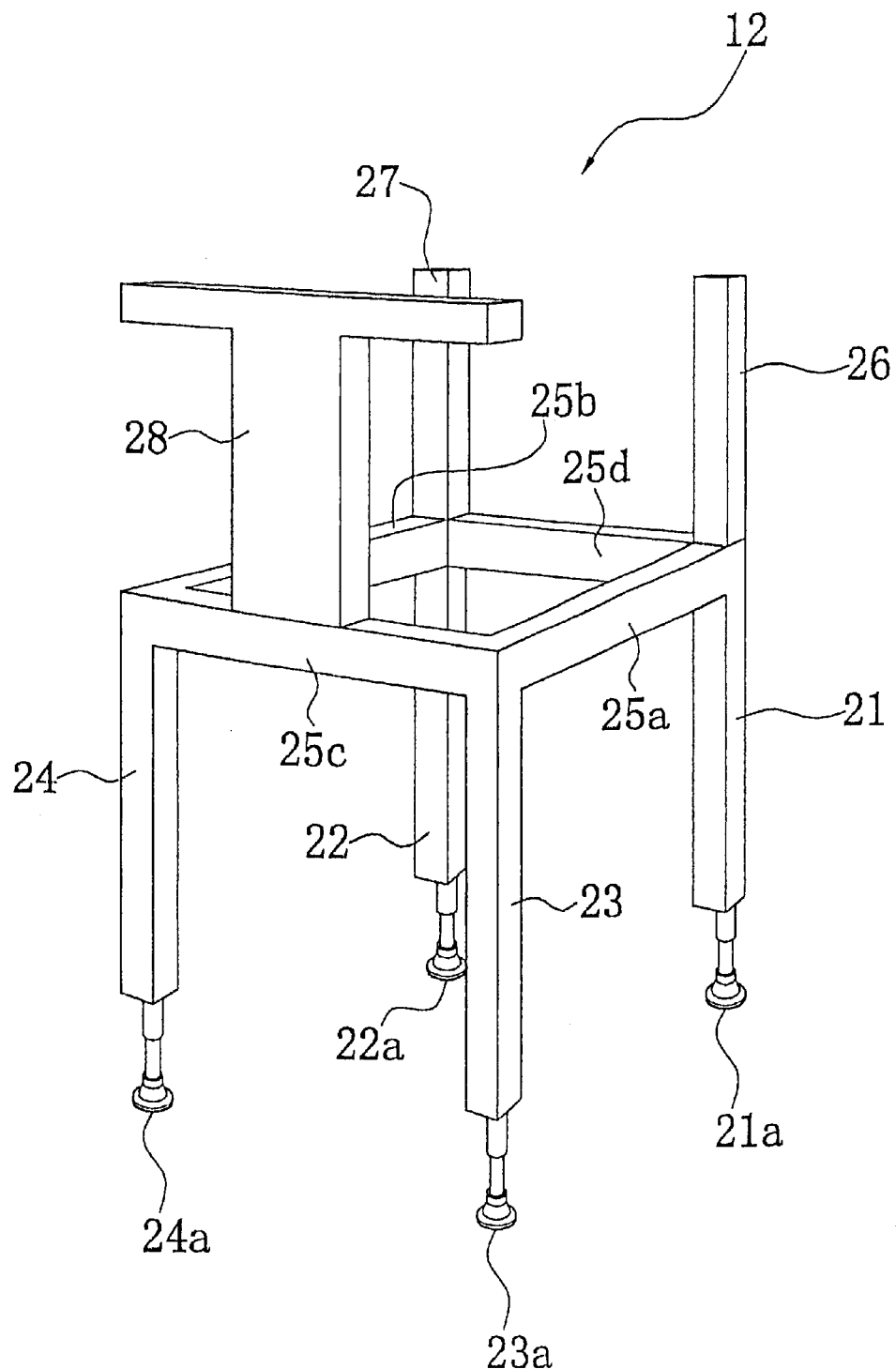
FIG. 2 is a perspective view of a support frame of the bag packaging apparatus depicted in FIG. 1 in accordance with the present invention shown removed from the bag packaging apparatus.

As shown in FIGS. 2 and 3, the support frame 12 includes four bottom pillars 21, 22, 23 and 24, horizontal beams 25*a*, 25*b*, 25*c* and 25*d*, upper pillars 26 and 27, and a large pillar 28. The bottom pillars 21, 22, 23 and 24 extend in a vertical upper direction from foot portions 21*a*, 21*b* 25*c* and 24*a*, which contact the floor of a factory. The horizontal beams 25*a*, 25*b*, 25*c* and 25*d* connect upper ends of the bottom pillars 21, 22, 23 and 24. The upper pillars 26 and 27 further extend in a vertical upper direction from the upper ends of the bottom pillars 21 and 22. The large pillar 28 extends in a vertical upper direction from a mid portion of the horizontal beam 25*c*. Referring to FIG. 3, a ceiling plate 29 is fixedly coupled to upper portions of the large pillar 28 and the upper pillars 26 and 27. The ceiling plate 29 has an opening in the center thereof. The support frame 12 supports mechanisms 13, 14, 15, and 17 of the bag packaging unit 5. In this embodiment, the support frame 12 also functions as a table that supports a computerized scale 2.

As shown in FIG. 3, the forming mechanism 13 includes a tube 31 and a forming shoulder 32. The tube 31 is a tubular member with both upper and bottom ends open. The tube 31 is disposed on the center opening of the ceiling plate 29 so as to be integrated with the forming shoulder 32 via a bracket. The bracket is not shown in figures. As each bag is formed, the bottom of the tubular film is sealed first. Then, potato chips are filled in the opening of the upper end of the tube 31 by an amount calculated by the computer scale 2. Thereafter, the top of the bag (and the bottom of the next bag) is sealed by the latitudinal seal mechanism 17. The forming shoulder 32 is disposed so as to surround the tube 31. The forming shoulder 32 is shaped such that sheet-shaped film F sent from the film supply unit 6 is formed in a tubular shape as it passes between the forming shoulder 32 and the tube 31. The forming shoulder 32 is also supported by the support frame 12 via a support member not shown in figures. Additionally, as shown in FIGS. 1 and 3, the forming mechanism 13 is disposed in a space above the space surrounded by the four bottom pillars 21, 22, 23 and 24. More specifically, the forming mechanism 13 is disposed in a space surrounded by the pillars 26, 27 and 28. The tube 31 and forming shoulder 32 can be replaced so as to fit the size of bags to be assembled and filled. When the tube 31 and/or forming shoulder 32 need to be replaced, an operator accesses the forming mechanism 13 through between the large pillar 28 and the upper pillar 27, or between the large pillar 28 and the upper pillar 26. Therefore, the forming mechanism 13 is detachable with respect to the support frame 12.

The pull-down belt mechanism 14 and the longitudinal seal mechanism 15 are supported by a rail 40 that hangs from the ceiling plate 29. The pull-down belt mechanism 14 and the longitudinal seal mechanism 15 are disposed so as to hold the tube 31 therebetween. When the tube 31 is replaced, the mechanisms 14 and 15 are moved along the rail 40 until they come to the positions that are out of the way. The pull-down belt mechanism 14 directs the tubular film F that is wrapped around the tube 31 in a downward direction with assistance of a vacuum source (not shown) that acts on the film 14 thereby holding the film F against the pull-down belt mechanism 14. The pull-down belt mechanism 14 mainly includes a drive roller 41, a driven roller, and a belt (contact portion) 43 which is configured to engage the film F in response to suction from the vacuum source. The longitudinal seal mechanism 15 pushes the overlapping portions of the tubular film F against the tube 31 by a predetermined force while heating the portions, thereby sealing the tubular film F in a longitudinal direction. The longitudinal seal mechanism 15 includes a heater and a heater belt (longitudinal seal portion) which is heated by a heater and contacts the overlapping portions of the tubular film F.

As shown in FIGS. 1 and 3, the pull-down belt mechanism 14 and the longitudinal seal mechanism 15 are also disposed in a space above the space surrounded by the four bottom pillars 21, 22, 23 and 24. More specifically, the pull-down belt mechanism 14 and the longitudinal seal mechanism 15 are in a space surrounded by the upper and large pillars 26, 27 and 28.

Settling Mechanism

The settling mechanism 16 is described below.

As shown in FIG. 3, the settling mechanism 16 is disposed below the forming mechanism 13, the pull-down belt mechanism 14, and the longitudinal seal mechanism 15, and above the latitudinal seal mechanism 17. The settling mechanism 16 contacts the tubular film F, after the film is sealed longitudinally and obtains a tubular shape, but before the tubular packaging film F is sent to the latitudinal seal mechanism 17 in order to urge all contents downward. In this manner, potato chips are pushed away from the portion of the tubular packaging film F that is to be sealed latitudinally prior to latitudinal sealing.

Figure 14:
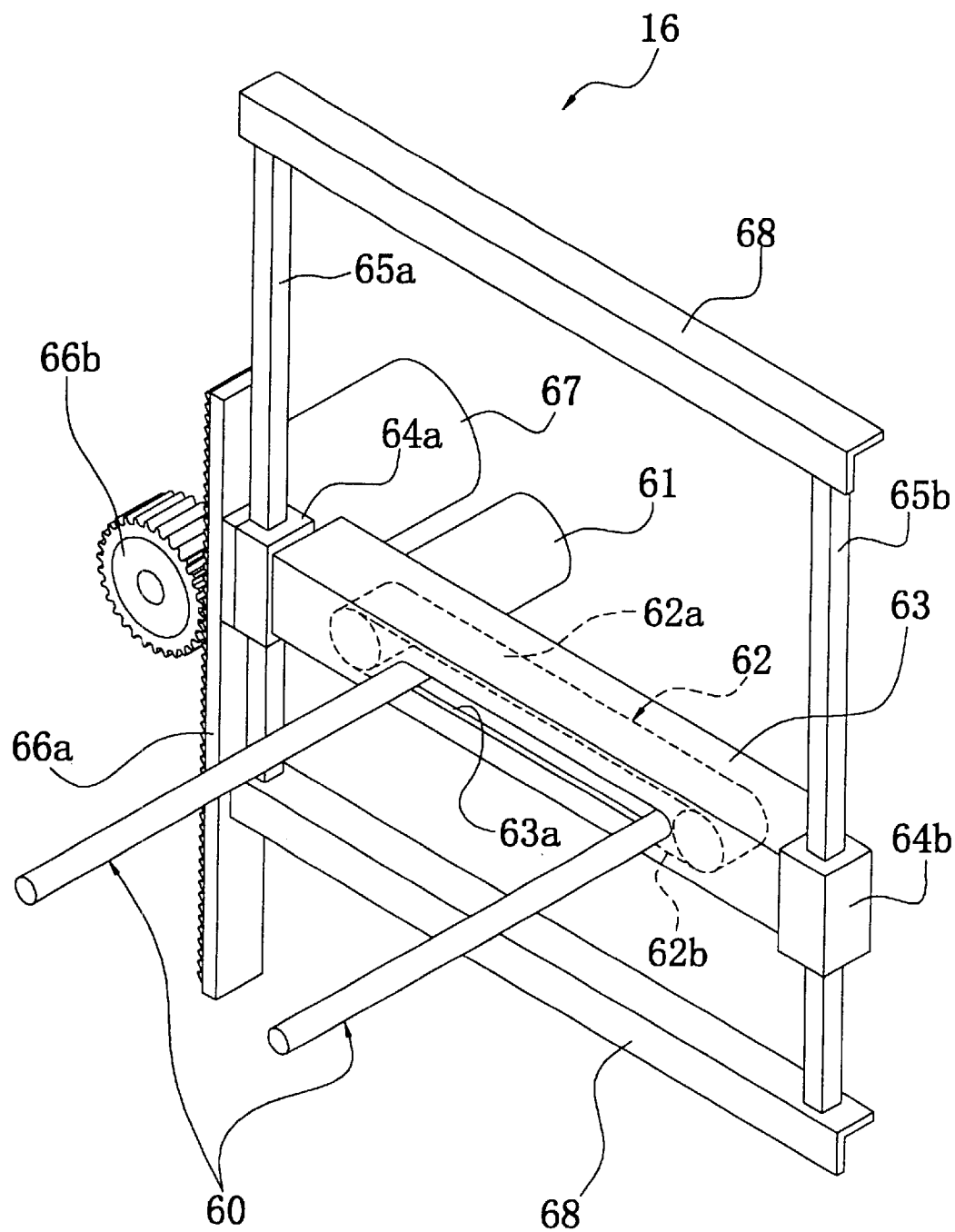
FIG. 14 is a perspective view of a packing mechanism for use in the bag packaging apparatus in accordance with the present invention.

Referring to FIGS. 3 and 14, the settling mechanism 16 includes a pair of pressing rods 60 supported by a movable supporting body 63, sliders 64a and 64b fixed to the supporting body 63, rails 65a and 65b, a rack 66a, and a pinion gear 66b. The support body 63 supports the pressing rods 60. The sliders 64a and 64b and the rails 65a and 65b support the support body 63 such that the support body 63 is selectively movable up and down along the rails 65a and 65b. The rack 66a is fixed to the slider 64a such that rotation of the pinion gear 66b moves the sliders 64a and 64b up and down along the rails 65a and 65b.

The pair of pressing rods 60 are movable on the supporting body 63 between a position where the pressing rods 60 are spaced apart from one another by a distance greater than the width of the largest bag to be packaged (as shown in FIG. 14), and another position where the pressing rods 60 are spaced apart by only a few millimeters (not shown). In other words, the pair of pressing rods 60 are supported by the support body 63 such that the pair of pressing rods 60 can be selectively moved toward each other and away from each other. The support body 63 includes therein a belt 62 that is activated by a motor 61. The pressing rods 60 are fixed to the belt 62. The pair of pressing rods 60 extends through an elongated bore 63a formed on a side of the support body 63. One of the pressing rods 60 is fixed to an upper portion 62a of the belt 62, and the other is fixed to a lower portion 62b. In this manner, the pressing rods 60 move toward each other when the belt moves in one direction as a result of rotation of the motor 61 in one direction, and the pressing rods 60 move away from each other when the belt moves in the opposite direction as a result of rotation of the motor 61 in the other direction. The motor 61 is a servomotor, and is fixed to a side of the support body 63 opposite the side from which the pressing rods 60 extend.

The sliders 64a and 64b engage the rails 65a and 65b, respectively, such that the sliders 64a and 64b are movable along the rails 65a and 65b. The rails 65a and 65b extend in the vertical direction.

The rack 66a extends in the vertical direction. The pinion gear 66b engages the rack 66a. Rotation of the pinion gear 66b effected by a motor 67, which is also a servomotor.

In view of the aforementioned structure of the settling mechanism 16, the motor 61 can control the pair of pressing rods 60 such that the pair of pressing rods 60 moves close to and away from each other. More specifically, the motor 67 can control the support body 63 that supports the pair of pressing rods 60, such that the support body 63 moves up and down.

Figure 9:
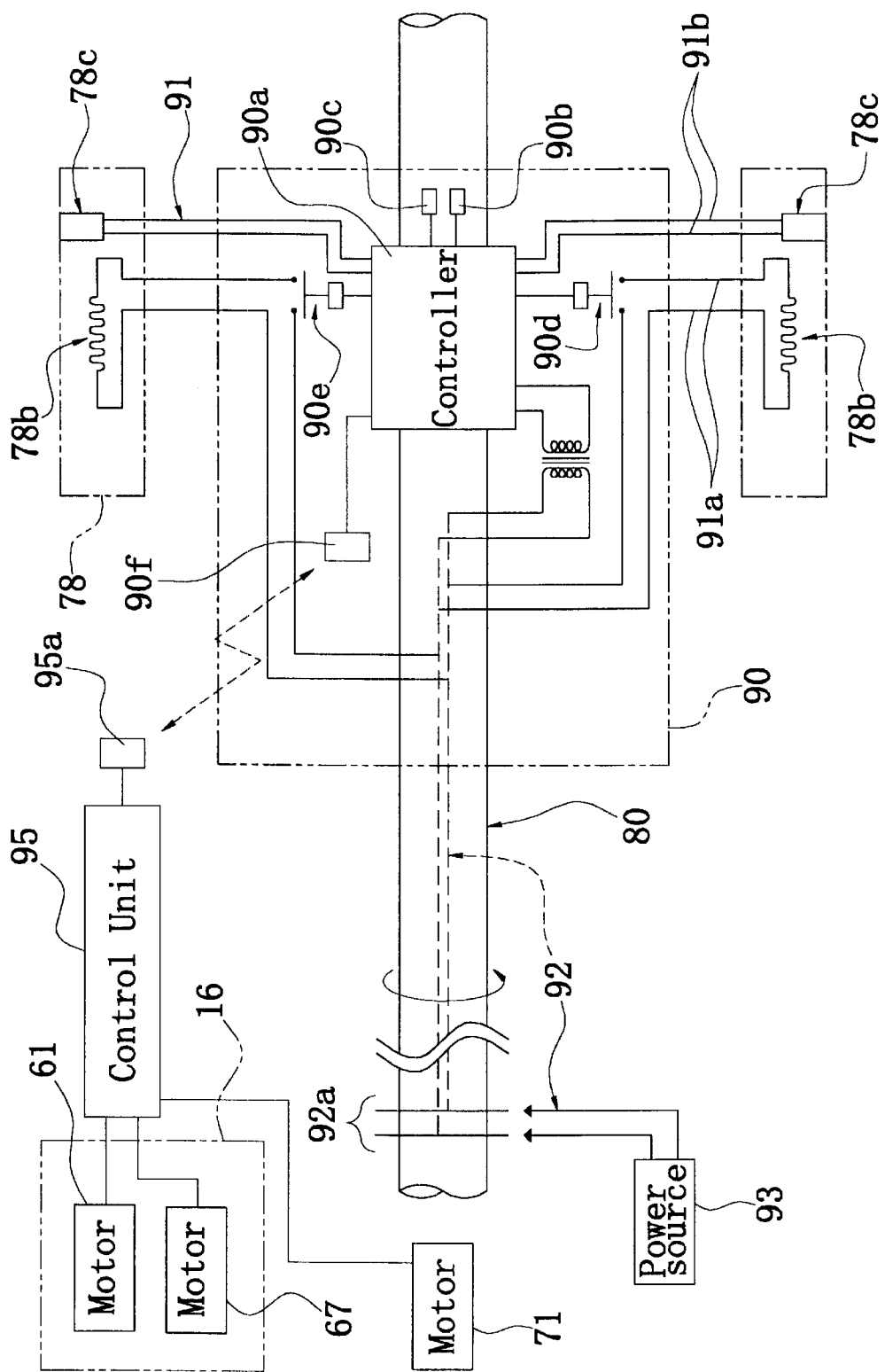
FIG. 9 is a schematic view of a heating control system for use in the bag packaging apparatus in accordance with present invention.

The operation of the motor 61 and the motor 67 is controlled by a fixed control unit 95 shown in FIG. 9, according to commands sent by a main control unit (not shown in Figures), which controls the entire bag packaging apparatus 1. The control unit 95 is programmed to allow adjustment (selection) of the moving distance the pressing rods 60 move when moving toward one another, and the control unit 95 also allows adjustment (selection) of the amount of up and down movement of the pressing rods 60 (referred to below as a pressing distance).

Latitudinal Seal Mechanism

The latitudinal seal mechanism 17 will now be explained.

Figure 4:
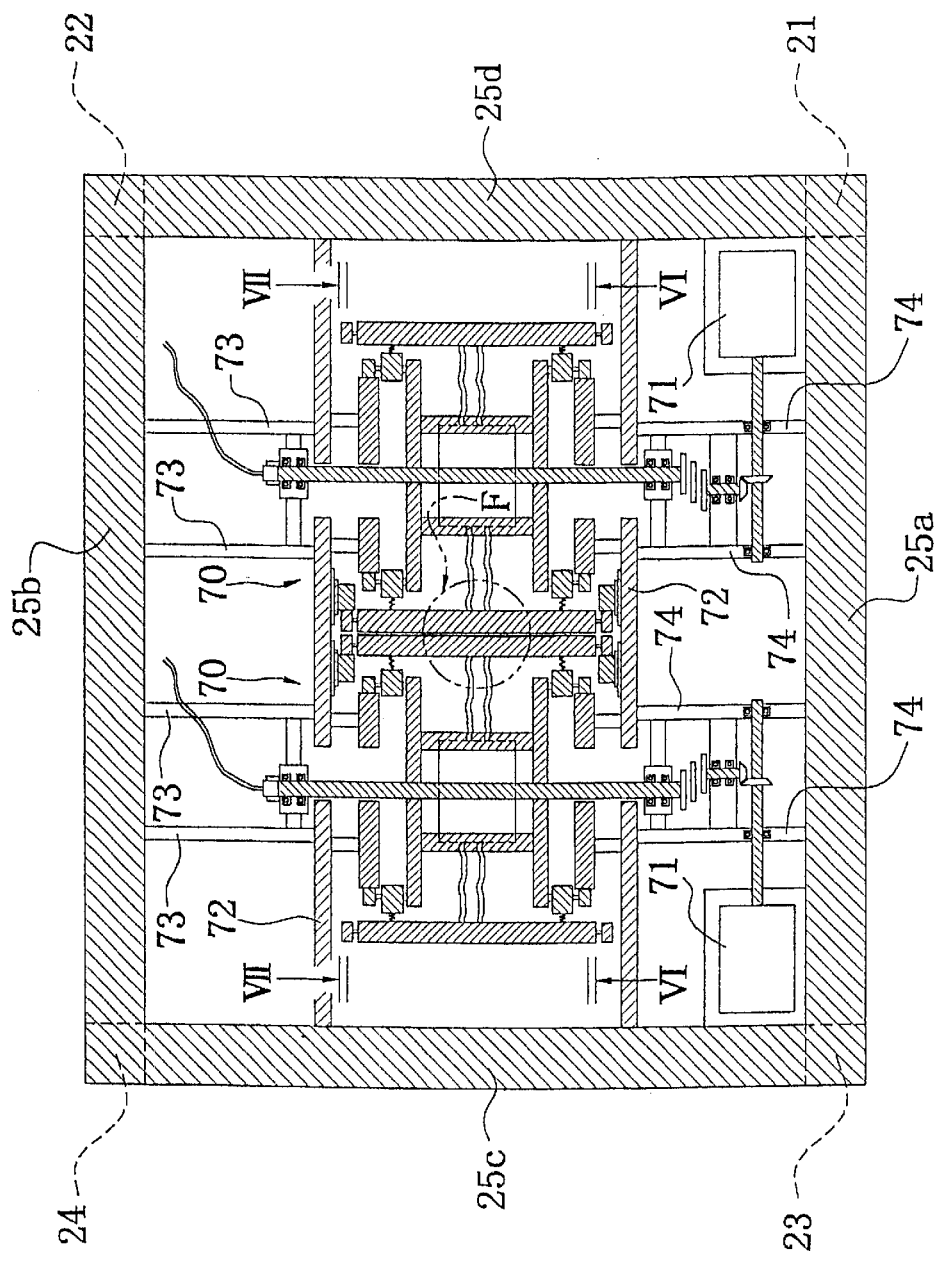
FIG. 4 is a cross-sectional view of the bag packaging unit taken along the line IV—IV in FIG. 3, in accordance with the present invention.

The latitudinal seal mechanism 17 is disposed below the settling mechanism 16, the pull-down mechanism 14, and the longitudinal seal mechanism 15. Referring to FIGS. 3 and 4, the latitudinal seal mechanism 17 is supported by the bottom pillars 21, 22, 23 and 24 and the horizontal beams 25a, 25b, 25c and 25d. As shown in FIG. 4, two support plates 72 are disposed in between the horizontal beam 25c and the horizontal beam 25d. Four support members 74 are disposed between the support plate 72 and the horizontal beam 25a. Four support members 73 are disposed between the other support plate 72 and the horizontal beam 25b.

Figure 5:
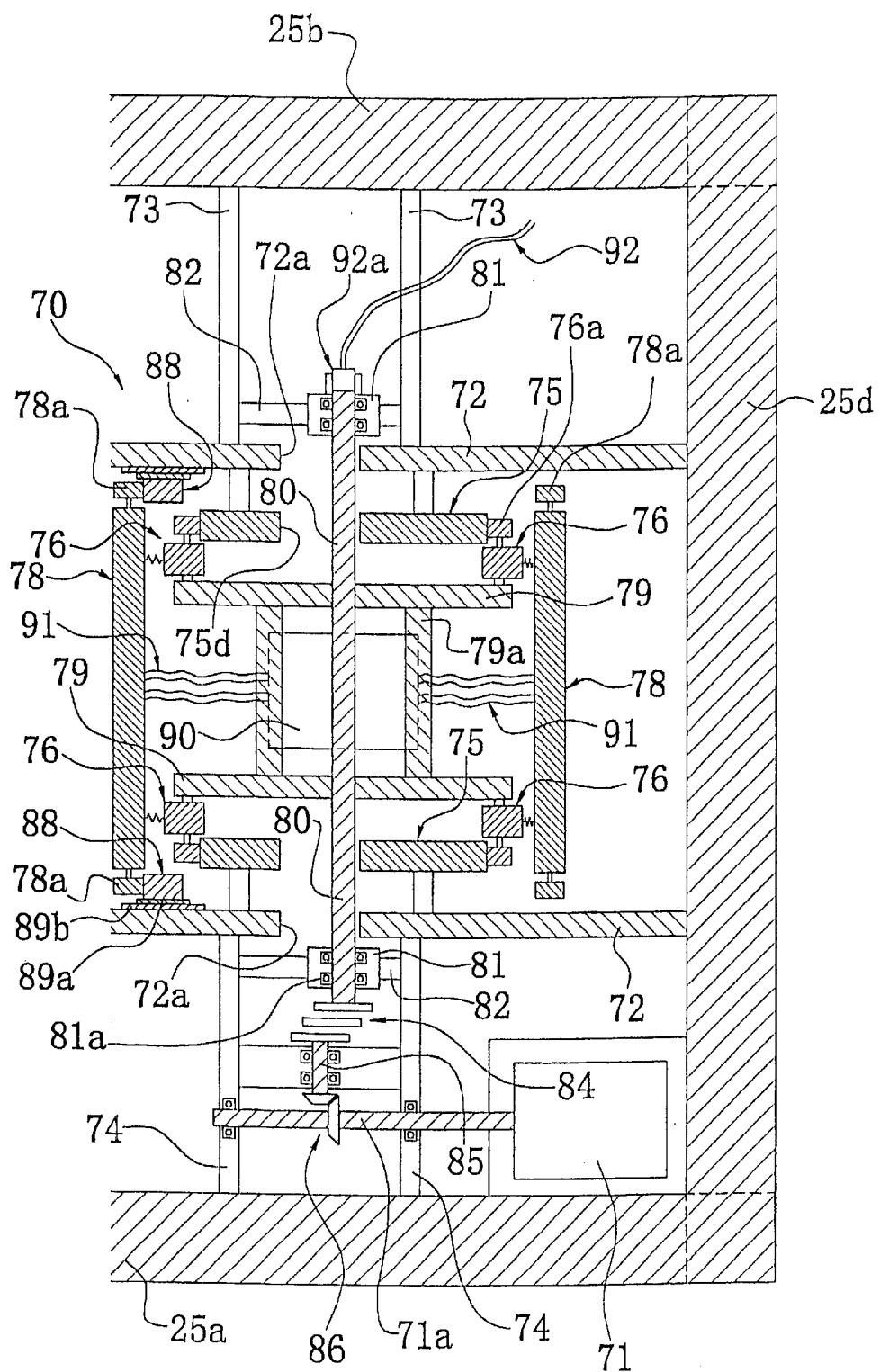
FIG. 5 is a fragmentary view of the bag packaging unit depicted in FIG. 4 as a slightly enlarged scale.

The latitudinal seal mechanism 17 includes a pair of mechanisms 70 that are symmetrically disposed between the beams 25c and 25d. FIG. 5 is an enlarged view of the mechanism 70 disposed closer to the horizontal beam 25d. Although following description pertains to the mechanism 70 on the horizontal beam 25d side, the mechanism 70 on the horizontal beam 25c side has a generally identical mirror image structure.

Figure 6:
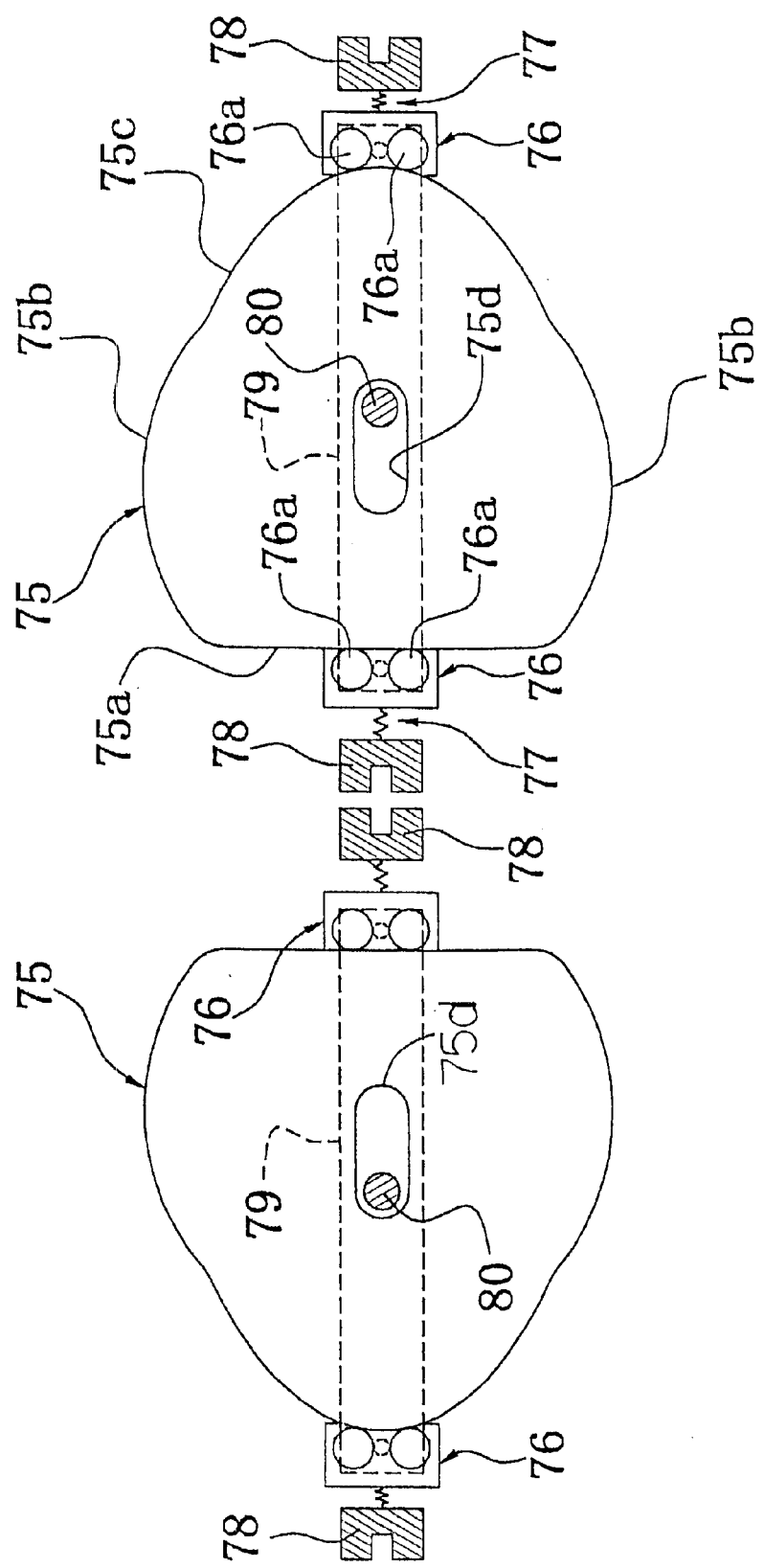
FIG. 6 is a cross-sectional view of a portion the bag packaging unit taken along the line VI—VI in FIG. 4 in accordance with the present invention.
Figure 7:
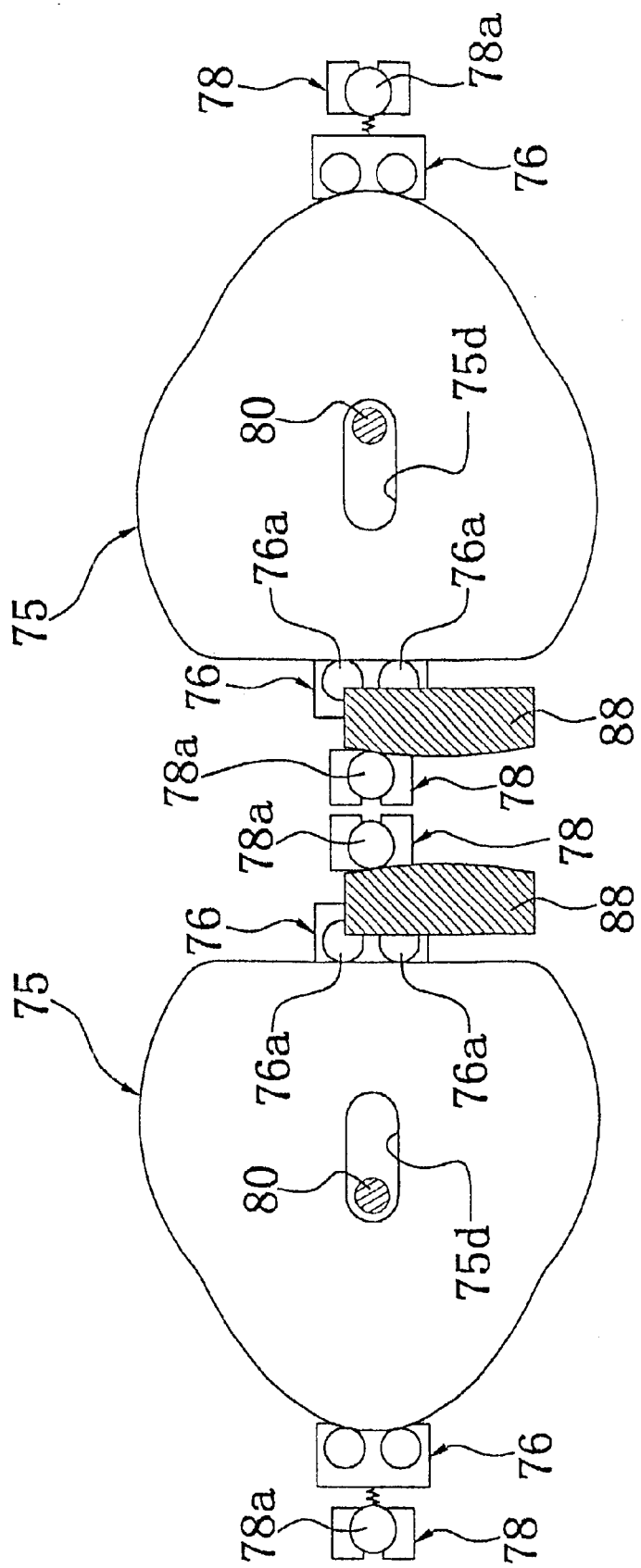
FIG. 7 is a cross-sectional view of the bag packaging unit taken along the line VII—VII in FIG. 4 in accordance with the present invention.

The mechanism 70 is configured to rotate two seal jaws 78 about a cam (described below) such that the seal jaws 78 moves in a path having the shapes of the letter D. The mechanism 70 pushes the seal jaw 78 against the seal jaw 78 of the other mechanism 70 to seal the tubular film in the latitudinal direction. As shown in FIGS. 5, 6 and 7, the mechanism 70 includes fixed cams 75, cam followers 76, a rotational shaft 80, coupling members 79, seal jaws 78, partial cam followers 78a, partial cams 88, and a motor 71.

The fixed cams 75 are disposed in a space between the two support plates 72. The fixed cams 75 are fixed to the support plates 72. As shown in FIG. 6, the fixed cams 75 have a shape that is substantially the shape of the letter D. Each of the fixed cams 75 has at its center an elongated bore 75d that is elongated in the direction of the horizontal beams 25a and 25b. Referring to FIG. 6, the fixed cam 75 includes a flat surface 75a that faces the fixed cam 75 of the other mechanism 70. The upper and bottom surfaces of the fixed cam 75 form arc surfaces 75b. The surface opposite the flat surface 75a forms a curved surface 75c.

Each fixed cam 75 engages two cam followers 76. The cam followers 76 are rotatably supported at opposite ends of the coupling member 79. Therefore, the distance between the two pairs of respective cam followers 76 remains constant. Each cam follower 76 has two rollers 76a that rotate while in contact with the peripheral surface of the fixed cam 75.

Referring to FIG. 5, the rotational shaft 80 extends through the openings 72a formed on the support plates 72 and the elongated bores 75d formed on the fixed cams 75. The rotational shaft 80 is pivotally supported by the bearings 81a which are disposed outside the space formed between the support plates 72. As shown in FIG. 5, the bearings 81a are fixed to the sliders 81. The sliders 81 slide along rails 82. Ends of respective ones of the rails 82 are fixed to respective support members 73 or 74. In this manner, bearings 81 move in the direction of the horizontal beams 25a and 25b. In other words, the rotational shaft 80 is supported so as to be movable in the direction of the horizontal beams 25a and 25b. The rotational shaft 80 extends through a portion of an elongated bore 75d (FIG. 7) formed in a respective one of the fixed cams 75 closest to the other mechanism 70

Figure 10:
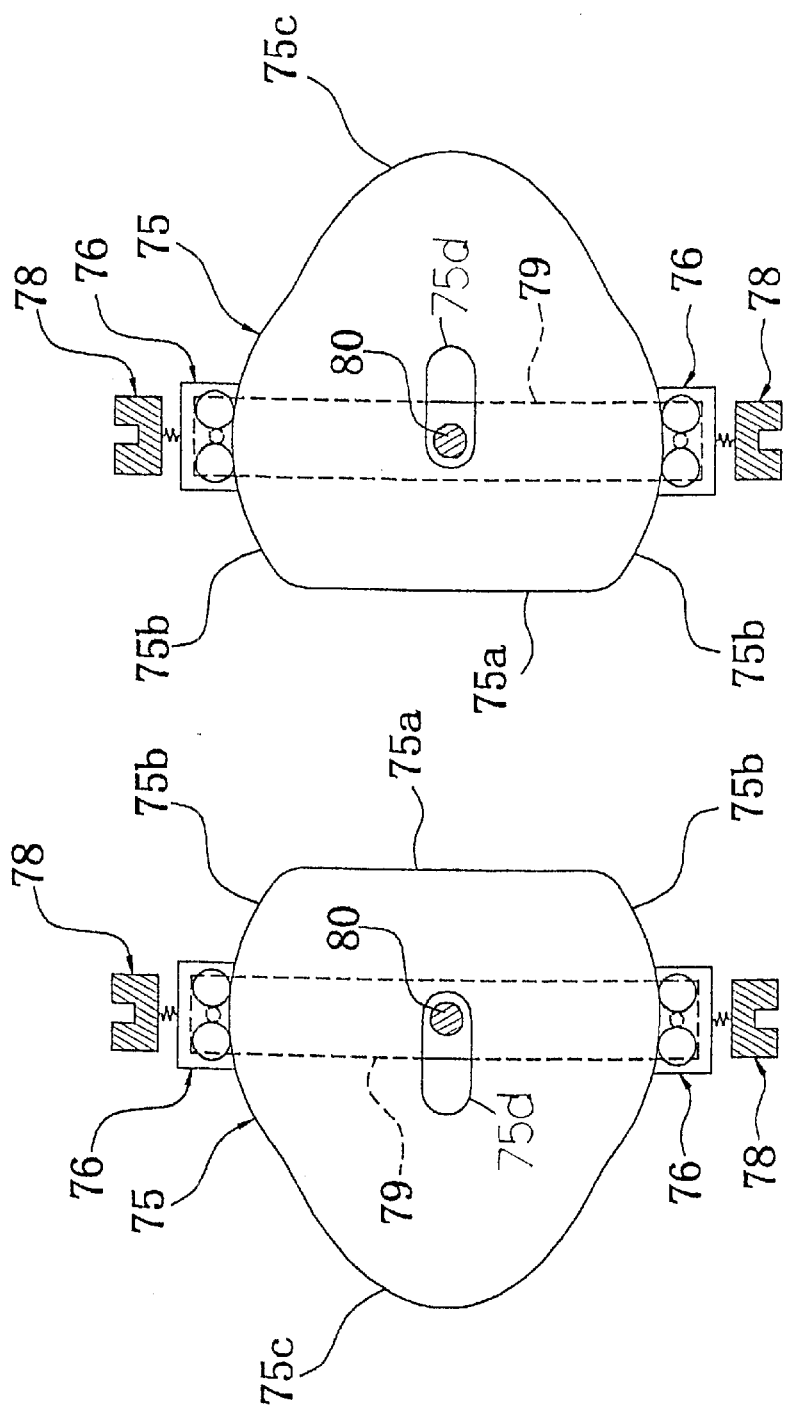
FIG. 10 is a view of the seal jaw being in a status where the cam followers are on the arc surfaces of the fixed cams.

(hereinafter referred to as "inner side") as shown in FIG. 10, and further the rotational shaft is movable within the elongated bore 75d to a position farthest from the other mechanism 70 (hereinafter referred to as "outer side") as shown in FIG. 6. Additionally, the sliders 81 have ball bearings or cylinders that roll on the rails 82. In this manner, the sliders 81 can slide against the rails 82 little, if any, frictional resistance.

Referring to FIG. 5, the rotational shaft 80 engages a shaft 85 via a Schmidt coupling 84 therebetween. The shaft 85 engages a rotational shaft 71a of the motor 71 via a bevel gear 86. The Schmidt coupling 84 is a shaft coupler having three disks that are linked together for axially transmitting rotation of an input shaft, the shaft 85, to an output shaft, the rotational shaft 80. The Schmidt coupling 84 can transmit rotation of the shaft 85 even when the rotational shaft 80 moves relative to the shaft 85 in a direction perpendicular to the rotational shaft 80, and therefore the distance between the two shafts changes. Consequently, the rotational shaft 80 rotates as the motor 71 rotates. The motor 71 is supported by the horizontal beams 25a and 25d, while the rotational shaft 71a of the motor 71 is supported by bearings fixed to the support members 74. The motor 71 is a servomotor that is adapted to control rotational speed and/or torque.

The centers of the coupling members 79 are fixed to the rotational shaft 80. Accordingly, the coupling members 79 rotate according to rotation of the rotational shaft 80. As described above, the cam followers 76 are coupled to both ends of the coupling members 79. Accordingly, as shown in FIG. 6 and other figures, each pairs of cam followers 76 are disposed on opposite sides of the mechanism 70 with respect to the rotational shaft 80. Changes in the distances between each pair of the cam followers 76 and the rotational shaft 80 are the same during rotation.

Figure 12:
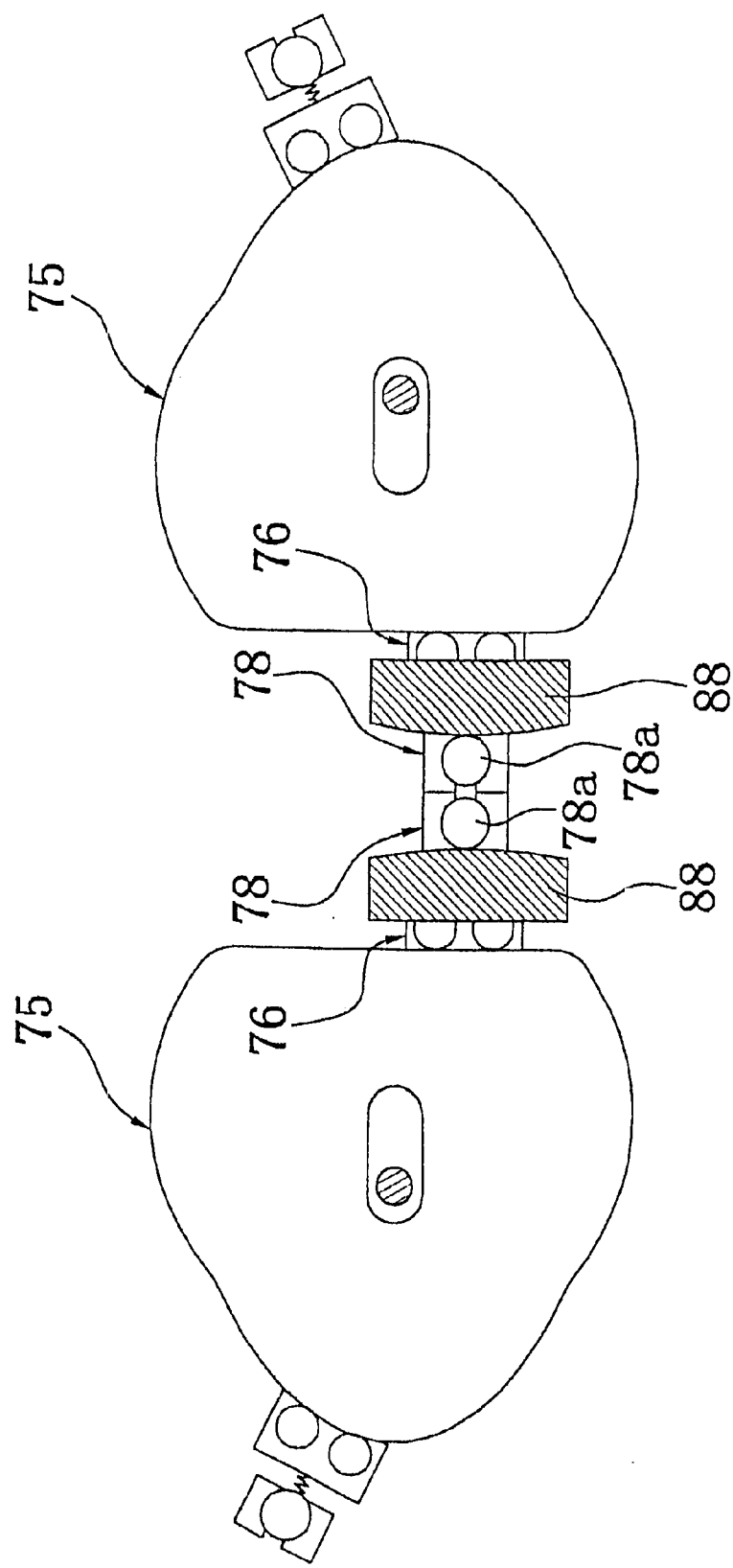
FIG. 12 is a view of the seal jaws of the bag packaging apparatus with the cam followers in full contact with the flat surfaces of the fixed cams.

Referring to FIGS. 5 and 6, the seal jaws 78 extend in the direction of the horizontal beams 25c and 25d. The seal jaws 78 are supported by the cam followers 76 via plate springs 77 at two different positions. The plate spring 77 is capable of a few millimeters of compression. As will be described below, the plate springs 77 extend when the partial cam 88 engages the partial cam follower 78a, and thereafter pulls the jaws 78 to restore the relative distance between the cam follower 76 and the seal jaws 78. There are two partial cam followers 78a on each seal jaw 78, one cam follower 78a disposed at each opposite end of the two seal jaws 78, and are supported by the seal jaws 78. As shown in FIGS. 7 and 12, the partial cam followers 78a rotate contacting an inner side surface of the partial cams 88 when the cam followers 76 pass adjacent to the partial cams 88.

Figure 8:
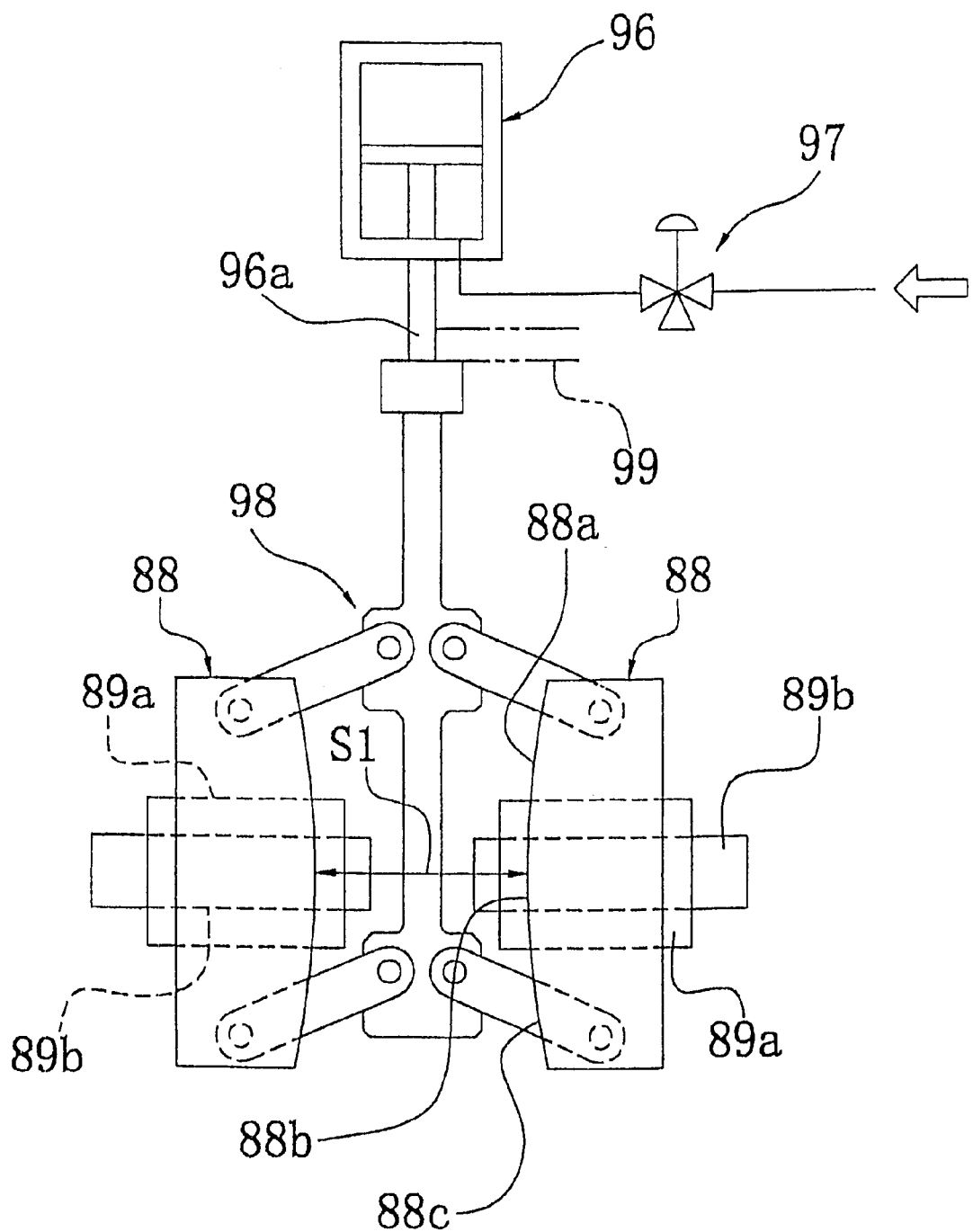
FIG. 8 is a schematic view of a latitudinal seal pressure generation mechanism using partial cams for use with the bag packaging apparatus in accordance with the present invention.
Figure 13:
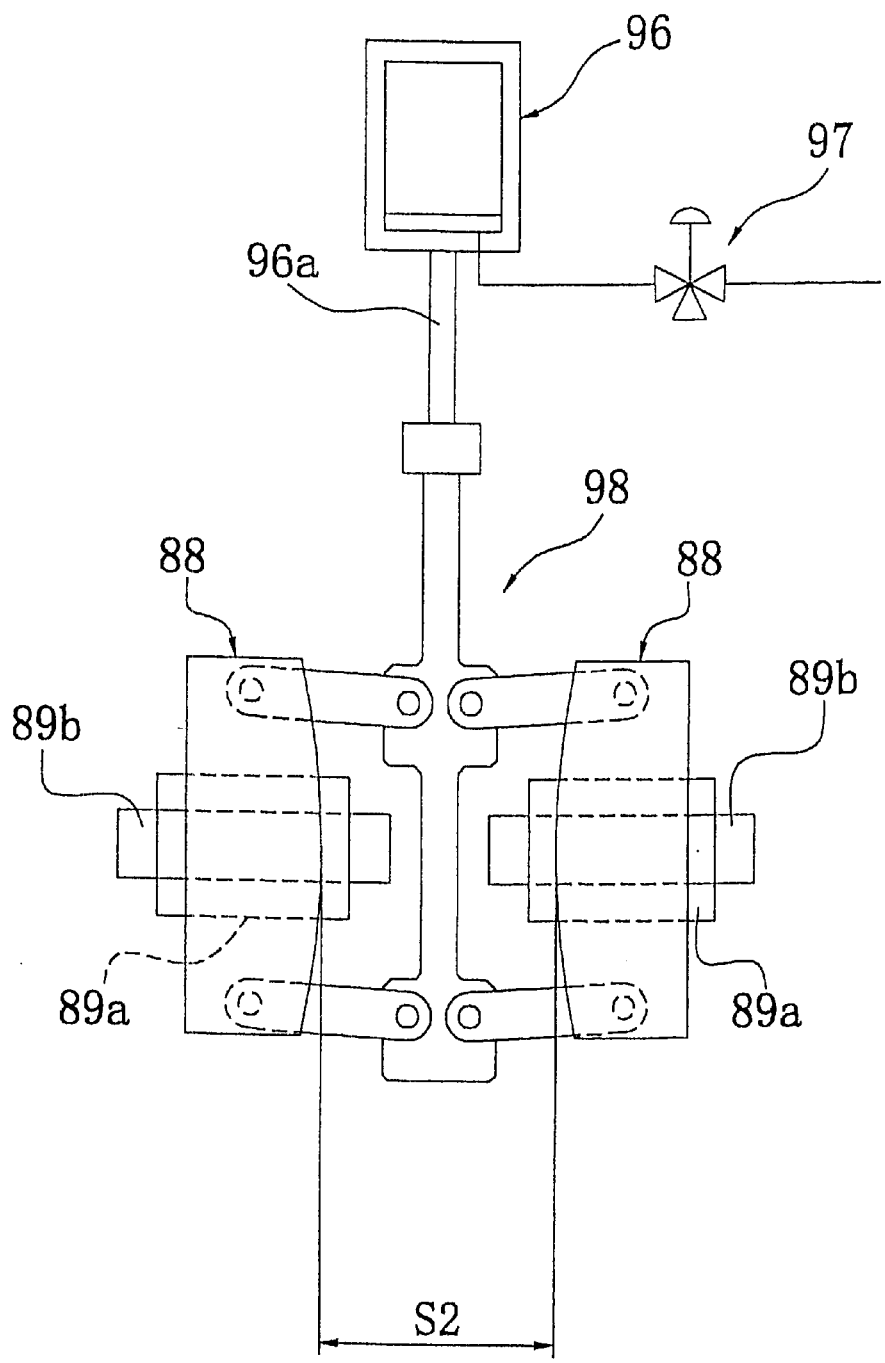
FIG. 13 is a view of the latitudinal seal pressure generation mechanism depicted in FIG. 8 in accordance with the present invention.

Each partial cam 88 is supported by the support plate 72 via a slider 89a and a rail 89b as shown in FIGS. 8 and 13. One partial cam 88 is fixed to a corresponding slider 89a, whereas the rail 89b is fixed to the support plate 72. The slider 89a engages the rail 89b, so as to slide along the rail 89b in the direction of the horizontal beams 25a and 25b while being supported by the rail 89b.

Referring to FIG. 8, the inner side surface of the partial cam 88 includes an entrance surface 88a, a pressure surface 88b, and an exit surface 88c. As shown in FIG. 7, when the partial cam follower 78a engages the entrance surface 88a, opposing seal jaws 78 face each other with a gap therebetween as shown in FIGS. 4 and 6. As shown in FIG. 7 when the partial cam follower 78a engages the entrance surface 88a, opposing seal jaws 78 face each other with a gap therebetween as shown in FIGS. 4 and 6. The pressure surface 88b is formed immediately below the entrance surface 88a. As shown in FIG. 12, when the partial cam follower 78a engages the pressure surface 88b, the opposing seal jaws 78 are urged against each other. The exit surface 88c (FIG. 8) is formed immediately below the pressure surface 88b. When the partial cam follower 78a engages the exit surface 88c, the seal jaws 78 again face each other with a gap therebetween.

Referring to FIG. 8, the partial cam 88 and the partial cam 88 of the other mechanism 70 are coupled to each other via a link mechanism 98. The positions of the partial cams 88 are determined by an air cylinder 96 that activates the link mechanism 98. As shown in FIG. 8, when the air cylinder 96 is connected with a high-pressure air supply, which is not shown in figures, via an electromagnetic three-way valve 97, the piston of the cylinder 97 is pulled up until it hits a stopper 99. When the piston hits the stopper 99, the partial cams 88 are closest to each other. At this point, the partial cam followers 78a engage the pressure surfaces 88b, and the seal jaws 78 are forced against each other (FIG. 12). The seal jaws 78 press against each other due to pressure from the partial cams 88. In other words, the partial cams 88 receive reaction force to move away from each other, from the seal jaws 78 via the cam followers 78a. However, the air cylinder 96 prevents the partial cams 88 on both sides from moving away.

The latitudinal seal mechanism 17 includes therein a cutter device (not shown) that severs a bag from a following bag by cutting the middle of the portion sealed by the seal jaws 78.

Heat Control of Latitudinal Seal Mechanism

The latitudinal seal mechanism 17 crimps portions of tubular film in a latitudinal direction by holding tubular films between the seal jaws 78. To seal, the seal jaws 78 need to apply both pressure and heat. To heat contacting surfaces (heated portion) of the seal jaws 78, which contact the tubular film, each seal jaw 78 includes heaters 78b (heating means) therein (FIG. 9). Also, each seal jaw 78 includes thermo-couples 78c to monitor whether or not the temperature of the contacting surfaces of the seal jaws 78 is adequate.

A control unit 90 (FIG. 9) that rotates with the rotational shaft 80 includes a controller 90a. The controller 90a monitors the temperature by the thermo couples 78c, and controls ON/OFF of the heaters 78b. As shown in FIG. 5, the control unit 90 is fixed to the support members 79a. The support members 79a connect the coupling members 79 that are fixed to the rotational shaft 80. The control unit 90 includes, apart from the controller 90a, memories 90b and 90c and switches 90d and 90e (FIG. 9). The memories 90b and 90c store predetermined (selected) temperatures for each heater 78b. The switches 90d and 90e control ON/OFF of power supply to each heater 78b. Referring to FIGS. 5 and 9, power supply lines 91a and compensating lead wires 91b extend from the control unit 90 to each of the seal jaws 78. The power supply lines 91a supply power to the heaters 78b. The compensating lead wires 91b connect the thermo couples 78c and the controller 90b.

Power is supplied to the controller 90a and each heater 78b from an external power source 93 through electricity distribution lines 92 that include a slip ring 92a. The slip ring 92 is utilized because the external power source 93 does not rotate. Power is first supplied the power distribution lines 92 that are inside the rotational shaft 80, which does rotate. The power is supplied to the control unit 90, to be distributed to the controller and each heater 78b therefrom. As shown in FIG. 5, the slip ring 92a is coupled to an end of the rotational shaft 80 that is closer to the horizontal beam 25b.

The controller 90a controls power supply to each heater 78b by switching ON/OFF of the switches 90d and 90e. The heaters 78*b* do not need to be kept on at all times during operation of the bag packaging apparatus 1. Instead, the heaters 78*b* need to be on only enough to warm a contacting surface of a seal jaw 78 of which the temperature has decreased. Therefore, the controller 90*a* of the control unit 90 controls such that the sum of power supplied to each heater 78*b* does not exceed a predetermined amount, by not turning the switches 90*d* and 90*e* ON at the same time. In other words, the controller 90*a* assigns time period to each heater 78*b*, during which power is supplied to the heater 78*b*.

In addition to the control unit 90, the latitudinal seal mechanism 17 additionally includes a fixed control unit 95, which is supported by the support frame 12 and is adapted not to rotate. The fixed control unit 95 includes a communicator 95*a* for wirelessly exchanging data (signal) with a communicator 90*f* of the control unit 90. The communicators 95*a* and 90*f* perform wireless communication using infra red or induction-type sensors. The wireless communication is utilized in situations such as when seal temperature has to be changed due to a change in the kind of film being used or the need for a change in the conveyance speed. The fixed control unit 95 is connected to the motor 61 and the motor 67 of the settling mechanism 17, and the motor 71 of the latitudinal seal mechanism. Upon receiving a command from the main control unit (not shown in Figures) which controls the entire bag packaging apparatus 1, the fixed control unit 95 controls the motors 71, 61, and 67, so as to rotate the seal jaws 78 or move the pressing rods 60 rectangularly.

Operation of Bag packaging apparatus

Operation of the bag packaging apparatus will now be explained.

Sheet-shaped film F is delivered from the film supply unit 6 to the forming mechanism 13, and then formed into a tubular shape as the film F pass the forming shoulder 23 and are wrapped about the tube 31. Then, the film F is conveyed in a downward direction by the pull-down belt mechanism 14. The film F stays wrapped about the tube 31, with both ends overlapping each other on the periphery of the tube 31. The longitudinal seal mechanism 15 seals the overlapping portions in a longitudinal direction.

Once sealed, the tubular film F now has a tubular shape. The tubular film F passes the tube 31, and is further sent down to the settling mechanism 16 and the latitudinal seal mechanism 17. The position of the film F at this stage is depicted in a two-dot chain line in FIG. 4. At this stage, as the tubular film F moves, a predetermined amount of potato chips are supplied from the computed scale 2 via the tube 31. At the latitudinal seal mechanism 17, the top and bottom ends of a bag are sealed in the latitudinal direction with potato chips filled in the tubular film F.

Bags B that have been packaged in the above described manner are conveyed to a belt conveyer (not shown in figures) by the inclined delivery plate 19 shown in FIGS. 1 and 3. The belt conveyer sends the bags B to devices that perform other processes, such as a weight checker.

Operation of Settling and Latitudinal Sealing of the Bag Packaging Apparatus

Operation of the settling and latitudinal sealing will now be explained.

In the settling mechanism 16, the motor 61 controls the pair of pressing rods 60 such that the pair of pressing rods 60 move toward and away from each other. The motor 67 manipulates the position of the support body 63 and the support body 63 in turn supports the pair of pressing rods 60 such that the support body 63 and pressing rods 60 move up and down. Operation of the motors 61 and 67 are controlled by the fixed control unit 95 shown in FIG. 9. The control unit 95 is programed such that the pair of pressing rods 60 in a rectangular motion, following the locuses T2 shown in FIG. 15.

Figure 15:
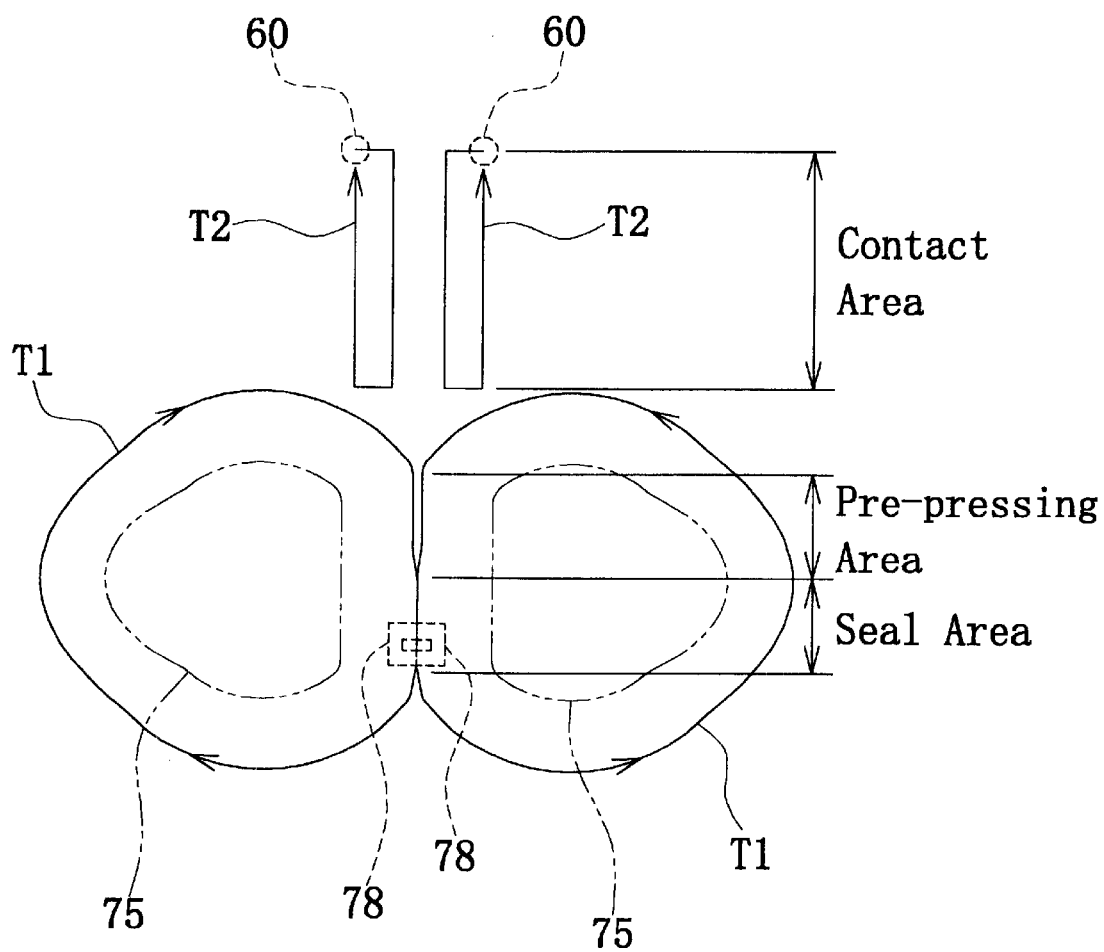
FIG. 15 is a schematic view of locuses defined by the seal jaws and settling mechanism.

In a "Contact Area" shown in FIG. 15, the settling operation is performed within an area of the tubular film near a portion of the tubular film that is about to be sealed. Specifically, the area of the tubular film contacted by the pressing rods 60 is not an area of the tubular film that is currently being sealed by the seal jaws 78 of the latitudinal seal mechanism 17. In the depicted embodiment, the pair of pressing rods 60 are held close to each other with a gap of 10 millimeters therebetween. Then the pair of pressing rods 60 move downward at a speed faster than (for instance, two to three times faster than) the speed of conveyance of the tubular film F. As a result, contents of the bag, such as potato chips, are pushed downward. Consequently, there is less burden on a pre-pressing operation performed by the seal jaws 78 press the tubular film just before the latitudinal sealing operation (described in greater detail below). By performing a settling operation, potato chips will not be sealed in the sealing portion of the tubular film (now a bag) at the time of latitudinal sealing, even if there is not much pressing distance for pre-pressing. The contacting distance ("Contact Area" in FIG. 15) along which the pair of pressing rods 60 contact the tubular film as part of the settling operation is longer than the pressing distance ("Pre-Pressing Area" in FIG. 15) for pre-pressing.

When the pair of pressing rods 60 are closest together in the locus T2, a gap therebetween is chosen, for instance, at 10 millimeters because the settling operation only has to press gently on the sides of the newly formed bag to move the material inside toward the central and lower portions of the newly formed bag, since the pre-pressing operation presses again the portion that is going to be sealed just prior to the latitudinal sealing. If the gap between the pressing rods 60 is too small at the time of settling operation, it is possible that the tubular film may blowup or burst. It is likely to happen especially since the contact distance for the settling operation is relatively long, as shown in FIG. 15.

Latitudinal Sealing Operation

Figure 11:
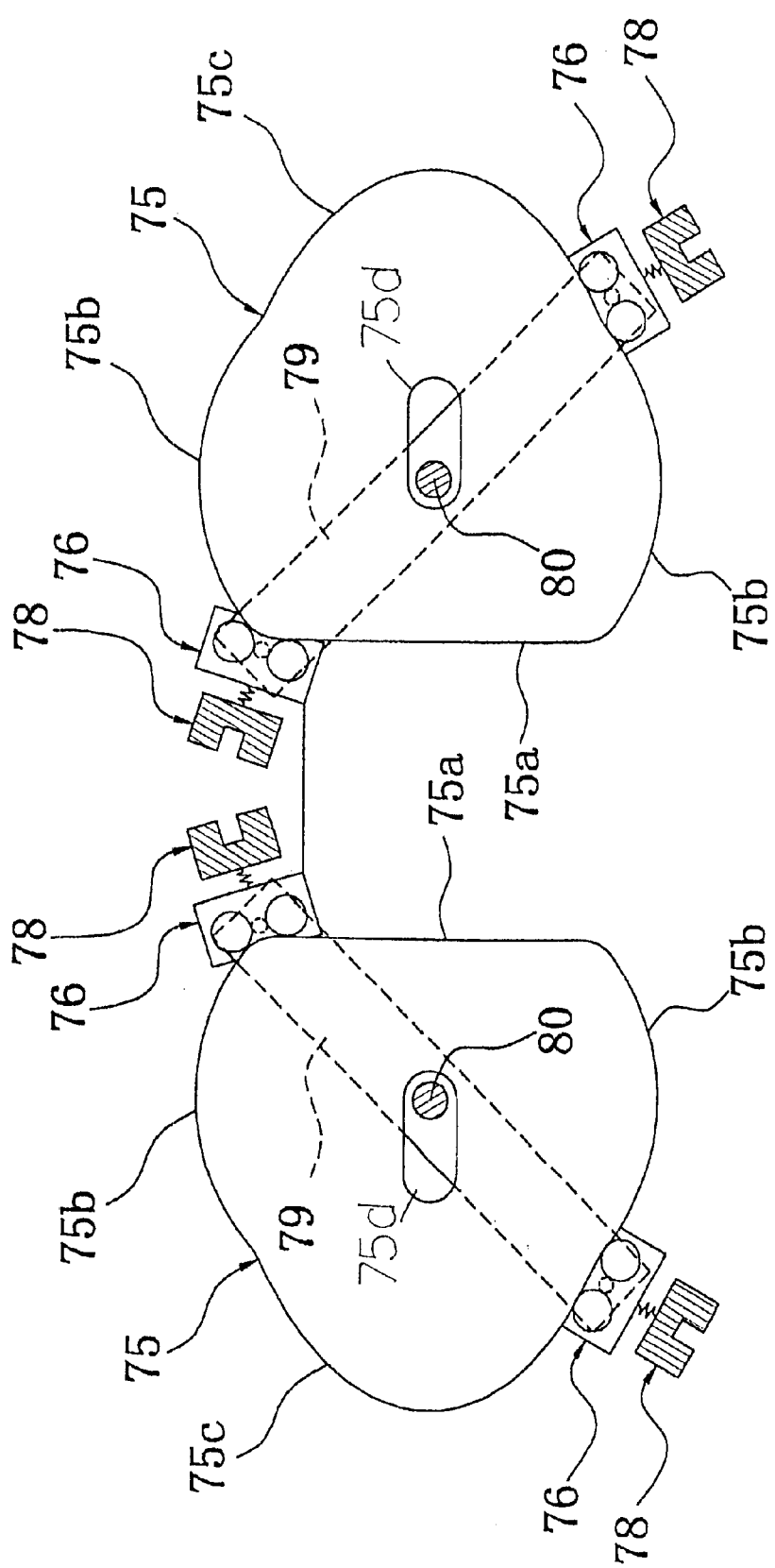
FIG. 11 is a view of seal jaws of the bag packaging apparatus shown with the cam followers beginning to contact flat surfaces of the fixed cams.

In the latitudinal seal mechanism 17, rotation of the motor 71 moves the cam follower 76 and the seal jaw 78 in a circular manner about the rotational shaft 80. Since the cam follower 76 is coupled to each end of the coupling member 79, the two cam followers 76 effectively hold the fixed cam 75 therebetween. Accordingly, the rollers 76a of the cam followers 76 move along the periphery of the fixed cam 75. Then, the rotational shaft 80 moves horizontally as shown in FIGS. 6, 10 and 11. More specifically, when the rollers 76*a* of the cam follower 76 are on the arc surfaces 75*b* as shown in FIG. 10, the rotational shaft 80 is on the inner side of the elongated bore 75*d*. As the latitudinal seal mechanism 17 shifts from a status shown in FIG. 11 to a status shown in FIG. 6, in other words, as rollers 76*a* of one cam follower 76 move on the flat surface 75*a* and rollers 76*a* of the other cam follower 76 move on the curved surface 75*c*, the rotational shaft 80 moves between the inner side and the outer side within the elongated bore 75*d*. In this manner, the rotational shaft 80 repeats stopping at the inner side of the elongated bore 75*d* and moving linearly back and forth between the inner side and the outer side of the elongated bore 75*d*.

The cam followers 76 rotate along the periphery of the fixed cam 75, drawing a locus in the shape of letter D, as described above. The seal jaws 78 also rotate following the cam followers 76. In addition, the seal jaws 78 rotate relative to the cam follower 76 when they are in the area near the partial cam 88. As the inner cam follower 76 moves into the flat surface 75a, in other words from a status shown in FIG. 11 to a status shown in FIG. 6, a partial cam follower 78a at an end of the seal jaw 78 engages an inner side surface (entrance surface 88a) of the partial cam 88, as shown in FIG. 7. Thereafter, the cam follower 76 keeps moving while contacting the fixed cam 75. The seal jaw 78 moves downward while moving horizontally away from the cam follower 76 (FIG. 12) At this time, the plate spring 77 that couples the cam follower 76 and the seal jaw 78 is extended. Accordingly, the seal jaw 78 and the corresponding seal jaw 78 of the other mechanism push against each other. Further, as the partial cam follower 78a moves from the pressure surface 88b to the exit surface 88c, the seal jaws 78 move away from one another.

FIG. 15 shows rotational locuses T1 of the seal jaws 78, including the locus in the areas near the partial cams 88. Specifically, the rotational locus T1 is a locus of an end of the seal jaw 78, in other words, a contacting surface of the seal jaw 78 that contacts the tubular film F. In this manner, in the latitudinal seal mechanism 17, the seal jaw 78 of one mechanism 70 rotates drawing a locus approximately in the shape of letter D, whereas the seal jaw 78 of the other mechanism 70 rotates drawing a locus approximately in the shape of inverted letter D. In the process of rotation, the seal jaws 78 of the two mechanisms 70 push against each other in the process of the rotation.

In the area shown as "Pre-pressing", pressing operation (pre-pressing operation) is performed on a portion of the tubular film that is going to be sealed. In this process, the seal jaws 78 move downward at a speed a few times (for instance, three times) faster than the conveyance speed of the tubular film F, with the contacting surfaces of the seal jaws 78 being kept approximately one millimeter apart from each other with the tubular film F therebetween. In this manner, potato chips in the portion of the tubular film F to be sealed are pushed downward such that potato chips will not be sealed with the tubular film F at the time of sealing and cause an improper sealing. The contacting surfaces of the seal jaws 78 are kept approximately one millimeter apart from one another because potato chips are approximately one millimeter thick. If the gap between the seal jaws 78 is two millimeter or greater, it is more likely that potato chips remain in the portion to be sealed, especially when the bag packaging apparatus is operated at a high speed.

Next, as the seal jaws 78 move through the "Seal" area shown in FIG. 15, an upper portion of a bag B and a bottom portion of a following bag are sealed at the same time. During the actual sealing process, the seal jaws 78 move basically at the speed of the conveyance speed of the tubular film F (bag). As the tubular film F is sealed, the cutter device disposed in the seal jaws 78 separates bag B from the following tubular film F.

Coordination Between Latitudinal Sealing and Settling

Coordination between the latitudinal sealing by the seal jaws 78 of the latitudinal mechanism 17 (including pre-pressing) and the settling by the settling mechanism 16 will now be explained with reference to FIGS. 16A, 16B, 16C, 16D, 16E and 16F.

Figure 16A:
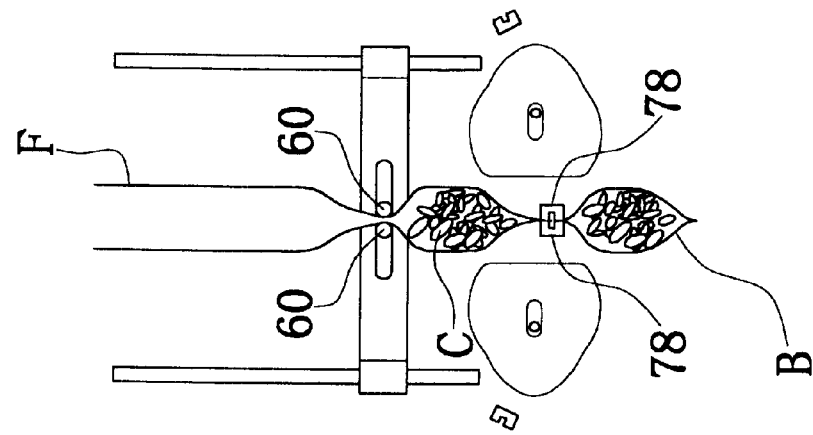

In FIG. 16A, the pre-pressing operation is just about to begin on an upper end of a bag in which potato chips C are being inserted from the computerized scale 2 through the tubular film F, from which the bag is made.

Figure 16B:
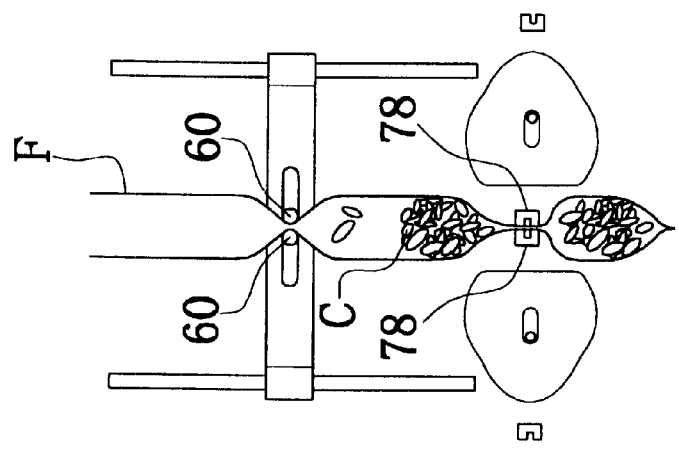

The pre-pressing operation is performed between stages shown in FIGS. 16A and 16B as the seal jaws 78 engage the upper end of the bag B. In the pre-pressing operation, the seal jaws 78 are held approximately one millimeter apart holding the tubular film F therebetween. The seal jaws 78 then move downward at a speed a few times faster than the conveyance speed of the tubular film F. In this manner, potato chips C to be filled in the bag are pushed below the pressing rods 60 while the pre-pressing operation is performed on the upper end of the soon to be sealed bag B.

Figure 16C:
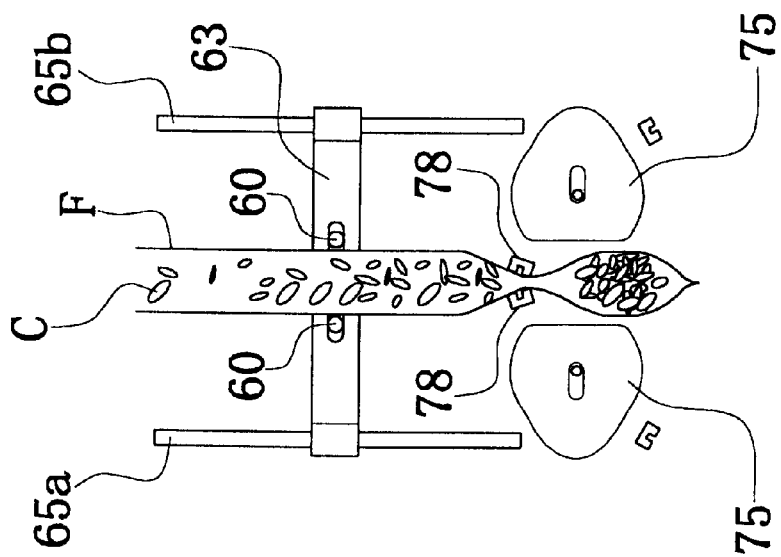

In between stages shown in FIGS. 16B, 16C, and 16D, the upper end of the preceding bag and the bottom end of the following bag are sealed latitudinally. In this process, the seal jaws 78 press the film F while moving downward at the same speed as the conveyance speed of the film F.

While latitudinal sealing is performed, a portion of the tubular film F that will subsequently become an upper end of the bag whose bottom end is being sealed, or an area near that portion of the tubular film F, is gently pressed by the pressing rods 60. During settling process, the pressing rods 60 are approximately ten millimeters apart hold the tubular film F therebetween, and are moving downward at a speed faster than the conveyance speed of the tubular film F. In this manner, potato chips C inside the bag are squeezed into a lower portion of the bag.

In a stage shown in FIG. 16D, it is preferable that the pressing rods 60 gently press the tubular film F up to slightly below the upper end of the bag B which is to be sealed. However, even if the pressing rods 60 do not reach the portion to be sealed, burden of pre-pressing can still be reduced. In other words, although it is preferable to press an area including the portion to be sealed, just pressing a portion above the portion to be sealed can similarly push potato chips to a lower portion of the bag.

In a stage shown in FIG. 16D, the upper portion of the preceding bag and the lower portion of following bag are sealed latitudinally. Prior to the completion of the latitudinal sealing, the settling operation of the pressing rods finishes, and the pressing rods move away from each other. Then, the pressing rods 60 move upward toward the stage shown in FIG. 16E. Having finished the sealing, the seal jaws 78 move away from the bag B and keep rotating.

In the stage shown in FIG. 16D, potato chips to be filled in the following bag are dropped through the tubular film F. Then in the stage shown in FIG. 16F (same as the stage shown in FIG. 16A), latitudinal sealing is performed on the upper end of the bag, and settling on an area near the upper end of following bag in the aforementioned manner.

In this manner, potato chips are packaged in bags continuously by repeating the stages shown in FIGS. 16A through 16F.

Features of the Bag Packaging Apparatus (1)

In the bag packaging apparatus 1, while the lower end of a bag and the upper end of a preceding bag are sealed, a portion that will become the upper end of the bag and the lower end of a following bag are pressed in advance. Therefore, latitudinal sealing can be performed without interference from potato chips, even when potato chips are packaged at a high speed.

In addition to settling, the portion to be sealed latitudinally is pressed again by the seal jaws 78 prior to sealing (pre-pressing). Therefore, it is even less likely that potato chips will remain in the sealing portion.

In this embodiment, since the settling mechanism 16 is formed separate from the latitudinal seal mechanism 17, the bag packaging mechanism 1 can secure a long pressing distance in which the tubular film can be pressed by the pressing rods 60.

(2)

As described above, in the bag packaging apparatus 1, settling on the upper end of the following bag is complete before latitudinal sealing on the upper end of the bag and the bottom end of the following bag is complete. Therefore, it is unlikely that the bottom ends of bags blowout due to pressure from settling, because the settling operation is already complete when the latitudinal sealing is finished and while the sealing at the bottom end of the bag is still relatively weak.

The gap between the pressing rods 60 during settling is set as approximately ten millimeters, greater than the gap (approximately one millimeter) between the seal jaws 78 while the seal jaws 78 perform the pre-pressing operation. Therefore, bags do not blowout even if the settling is performed on a long pressing distance, since air can escape in an upward direction from the bag during settling.

Furthermore, burden on the pre-pressing is reduced by assigning longer pressing distance to the settling mechanism 16 than the pressing distance of the pre-pressing.

If a length or a width of a bag needs to be changed, such information is sent from the main control unit to the fixed control unit 95. Pressing distance of the settling operation and the gap between the pressing rods 60 are changed accordingly by changing controls of the motors 61 and 67. As length of a bag becomes longer, the home position of the pressing rods 60 (position pressing rods 60 shown in FIGS. 15 and 16A) will move upward, whereby a longer pressing distance is secured.

(3)

In the bag packaging apparatus 1, the latitudinal seal mechanism 17 is supported by the support frame 12 on both sides, unlike a conventional bag packaging apparatus which is supported in a cantilever manner. The support frame 12 includes the foot portions 21a, 22a, 23a and 24a that are disposed so as to surround the latitudinal seal mechanism 17. The support frame 12 also includes four bottom pillars 21, 22, 23 and 24 that extend in a vertical upper direction from the foot portions 21a, 22a, 23a and 24a. Therefore, the support frame 12 can securely support the latitudinal seal mechanism 17. Accordingly, the latitudinal seal mechanism 17 does not rattle even when bag packaging process has been conducted at a high speed. Notably, the latitudinal seal mechanism 17 of the present embodiment rotates the seal jaws 78 in the shape of letter D. Rotation of seal jaw generally leads to greater rattling because of the weight and momentum of the seal jaw. However, since the latitudinal seal mechanism 17 is supported on both ends in this embodiment, the bag packaging apparatus of the present invention can keep rattling below an allowable level even at the time of high-speed processing.

In the bag packaging apparatus 1, the support frame 12 supports, other than the latitudinal seal mechanism, a series of mechanisms that form the films in tubular shape, deliver the films, and perform longitudinal sealing. These mechanisms, namely the forming mechanism 13, the pull down belt mechanism 14, the longitudinal seal mechanism 15, and the settling mechanism 16, are disposed in the space surrounded by the four bottom pillars 21, 22, 23 and 24, or a space thereabove, as the latitudinal seal mechanism 17 is. Therefore, there is less vibration due to movements of the belt 43 of the pull down belt mechanism 14 or the heater belt of the longitudinal seal mechanism 15. There is also less vibration due to the rectangular movement of the pressing rods 60 of the settling mechanism 16.

SECOND EMBODIMENT

In the first embodiment, the seal jaws 78 of the latitudinal seal mechanism 17 are used not only for sealing but also as means for pre-pressing. In other words, the latitudinal seal mechanism 17 includes a mechanism that presses a portion of the tubular film to be sealed just before the portion is sealed latitudinally.

However, the mechanism that presses the portion of the tubular film just before the portion is sealed latitudinally does not necessarily have to be included in the latitudinal seal mechanism. Instead, the mechanism can be formed as a separate mechanism from the latitudinal seal mechanism, which is disposed so as to press the tubular film just prior to sealing.

THIRD EMBODIMENT

Although the settling mechanism 16 is formed separate from the latitudinal seal mechanism 17 in the first embodiment, movement of the pressing rods 60 can be coordinated with movement of the seal jaws 78. In other words, the latitudinal seal mechanism 17 can include a mechanism that performs settling. For instance, the latitudinal seal mechanism 17 can be structured such that the pressing rods move rectangularly according to the movement of the rotational shafts 80, via a mechanism such as the link mechanism.

FOURTH EMBODIMENT

The first embodiment utilizes such settling mechanism 16 as one depicted in FIG. 14. However, the settling mechanism 16 can utilize one that includes a gear mechanism such that the pressing rods move toward and away from one another drawing arc-shaped locuses, or one that includes motorized ball screws. Additionally, the pressing rods do not necessarily need to move rectangularly. The pressing rods can move in any manner, even in an irregular manner, as long as the movement includes combination of up-down movement and horizontal movement, whereby settling is enabled.

FIFTH EMBODIMENT

In the first embodiment, the pressing rods 60 are cylindrical members. Alternatively, the pressing rods 60 can also include planar members attached to portions that contact the tubular films, such that the tubular films are pressed by the planar members.

It is also possible to let the cylindrical pressing rods 60 rotate, such that there is less friction between the tubular films and the pressing rods 60.

EFFECT OF INVENTION

By pressing an upper portion of a bag and a bottom portion of a following bag in advance, when a bottom portion of the bag and an upper portion of the preceding bag are sealed, the latitudinal seal mechanism can secure a long pressing distance. Therefore, the latitudinal seal mechanism can seal tubular packaging materials without sealing together articles to be packaged, even when bags are packaged at a high speed.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method of forming bags continuously, from a tubular packaging material that is conveyed in a downward direction, said method comprising the steps of:

inserting articles to be packaged in a partially formed bag;

moving sealing jaws into contact with at least one of a lower end of the bag and an upper end of a preceding bag to seal the tubular packaging material to form a bag; and moving pressing members to a portion of the tubular packaging material that subsequently forms an upper end of the bag and a lower end of a subsequent bag in order to urge the articles downward by moving the pressing members in a longitudinal direction at a speed different from a conveyance speed of the tubular packaging material, said step of moving the pressing members and said step of sealing being performed simultaneously.

2. A method as set forth in claim 1, wherein the sealing jaws seal the lower end of the bag and the upper end of the preceding bag by heating.

3. A method of forming bags continuously, from a tubular packaging material that is conveyed in a downward direction, said method comprising the steps of:

inserting articles to be packaged in a partially formed first bag before an upper end of the first bag is sealed;

moving pressing members to a portion of the tubular packaging material that subsequently forms the upper end of the first bag in order to urge the articles downward by moving the pressing members in a longitudinal direction at a speed different from a conveyance speed of the tubular packaging material, the pressing members contacting the portion of the tubular packaging material being spaced apart with a predetermined gap therebetween;

sealing a lower end of the first bag and an upper end of a preceding bag;

moving the pressing members to a portion of the tubular packaging material that subsequently forms an upper end of a second bag in order to urge the articles downward by moving the pressing members in a longitudinal direction at a speed different from the conveyance speed of the tubular packaging material, the pressing members contacting the portion of the tubular packaging material being spaced apart with the predetermined gap therebetween; and sealing a lower end of the second bag and the upper end of the first bag, the first of said steps of moving the pressing members and the first of said steps of sealing occurring simultaneously, the second of said steps of moving the pressing members and the second of said steps of sealing occurring simultaneously.

4. A method of forming bags continuously from a tubular packaging material that is conveyed in a downward direction, said method comprising the steps of:

inserting articles to be packaged in a partially formed first bag before an upper end of the first bag is sealed;

moving pressing members to a portion of the tubular packaging material that subsequently forms an upper end of the first bag in order to urge the articles downward by moving the pressing members in a longitudinal direction at a speed different from a conveyance speed of the tubular packaging material, the pressing members contacting the portion of the tubular packaging material being spaced apart with a first predetermined gap therebetween;

pre-pressing a lower portion of the first bag with sealing jaws;

sealing a lower end of the first bag and an upper end of a preceding bag with the sealing jaws;

inserting articles to be packaged in a partially formed second bag before the upper end of the first bag and a lower end of the second bag are sealed;

moving the pressing members to a portion of the tubular packaging material that subsequently forms an upper end of the second bag in order to urge the articles downward by moving the pressing members in a longitudinal direction at a speed different from the conveyance speed of the tubular packaging material, the pressing members contacting the portion of the tubular packaging material being spaced apart with the first predetermined gap therebetween;

pre-pressing a lower portion of the second bag with sealing jaws; and sealing the lower end of the second bag and the upper end of the first bag, the first of said steps of moving the pressing members and the first of said steps of sealing occurring simultaneously, the second of said steps of moving the pressing members and the second of said steps of sealing occurring simultaneously.

5. A method as set forth in claim 4, wherein in each of said steps of moving the pressing members, the pressing members move downward at a speed greater than the conveyance speed of the tubular packaging material.

6. A method as set forth in claim 5, wherein each of said steps of pre-pressing includes moving the sealing jaws downward on opposite sides of the tubular packaging material at a rate higher than the rate of downward movement of the tubular packaging material with the sealing jaws spaced apart from each other by a second predetermined gap.

7. A bag packaging apparatus for producing bags filled with articles to be packaged by sealing a tubular packaging material at least in a latitudinal direction to form the bags, said bag packaging apparatus comprising:

supplying means for supplying the tubular packaging material for receiving the articles to be packaged;

a packaging material conveyance mechanism for conveying the tubular packaging material in a downward direction;

a latitudinal seal mechanism for sealing in the latitudinal direction portions of the tubular packaging material, the tubular packaging material being conveyed thereto defining a predetermined distance at the portions, said latitudinal seal mechanism being disposed below said supplying means; and a settling mechanism disposed between said supplying means and said latitudinal sealing means and having pressing rods, said settling mechanism adapted for moving the pressing rods to the portion of the tubular packaging material that is subsequently sealed by said latitudinal seal mechanism, in order to urge the articles downward by moving the pressing rods in a longitudinal direction at a speed different from a conveyance speed of the tubular packaging material, the pressing rods being spaced apart with a first predetermined gap therebetween, the first predetermined gap being narrower than the predetermined distance, the portion becoming an upper end of one bag, said settling mechanism moving the pressing rods when said latitudinal seal mechanism seals the tubular packaging material.

8. The bag packaging apparatus as set forth in claim 7, wherein said latitudinal seal mechanism includes means for pre-pressing the tubular packaging material prior to sealing such that the portion of the tubular packaging material to be sealed is pressed together just before said latitudinal seal mechanism seals the tubular packaging material in the latitudinal direction.

9. The bag packaging apparatus as set forth in claim 8, wherein said latitudinal sealing mechanism includes two sealing members, and said means for pre-pressing comprises cam surfaces such that in response to said sealing members being engaged with said cam surfaces said sealing members pre-press the tubular packaging material with a second predetermined gap between said sealing members.

10. The bag packaging apparatus as set forth in claim 9, wherein said settling mechanism comprises two of said pressing rods supported in said bag packaging apparatus, said two pressing rods being adapted for selective vertical movement with respect to the tubular packaging material with the first predetermined gap therebetween while moving against the tubular packaging material, said first predetermined gap between said pressing rods being greater than said second predetermined gap between said sealing members as said sealing members pre-press the tubular packaging material.

11. The bag packaging apparatus as set forth in claim 10, wherein said pressing rods are adapted for selective vertical movement with respect to the tubular packaging material by a distance that is greater than a longitudinal distance in which said sealing members pre-press the tubular packaging material.

12. The bag packaging apparatus as set forth in claim 11, wherein said settling mechanism is adapted to complete the vertical movement in contact with the portion of the tubular packaging material before said latitudinal seal mechanism seals a lower end of the one bag and an upper end of a previous bag.

13. The bag packaging apparatus as set forth in claim 12, further comprising a control unit connected to said settling mechanism for controlling said settling mechanism.

14. The bag packaging apparatus as set forth in claim 13 further comprising a controller connected to said sealing mechanism for controlling said sealing mechanism.

\* \* \* \* \*